United States Patent
Yamamoto

(10) Patent No.: US 9,680,150 B2
(45) Date of Patent: Jun. 13, 2017

(54) ELECTRICAL DEVICE

(71) Applicant: NISSAN MOTOR CO., LTD., Yokohama-shi, Kanagawa (JP)

(72) Inventor: Shinji Yamamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/113,512

(22) PCT Filed: Jan. 24, 2014

(86) PCT No.: PCT/JP2014/051528
§ 371 (c)(1),
(2) Date: Jul. 22, 2016

(87) PCT Pub. No.: WO2015/111188
PCT Pub. Date: Jul. 30, 2015

(65) Prior Publication Data
US 2017/0012287 A1    Jan. 12, 2017

(51) Int. Cl.
*H01M 4/525* (2010.01)
*H01M 4/587* (2010.01)
(Continued)

(52) U.S. Cl.
CPC ........ *H01M 4/525* (2013.01); *C01G 45/1228* (2013.01); *C01G 53/44* (2013.01);
(Continued)

(58) Field of Classification Search
CPC ...... H01M 4/131; H01M 4/133; H01M 4/134; H01M 4/364; H01M 4/386; H01M 4/505;
(Continued)

(56) References Cited

U.S. PATENT DOCUMENTS 7,732,095 B2   6/2010  Christensen et al.
7,972,727 B2   7/2011  Christensen et al.

FOREIGN PATENT DOCUMENTS

JP    2009-517850 A    4/2009

OTHER PUBLICATIONS

U.S. Appl. No. 15/112,725, filed Jul. 20, 2016, Nissan Motor Co., Ltd.
(Continued)

*Primary Examiner* — Brittany Raymond
(74) *Attorney, Agent, or Firm* — Foley & Lardner LLP

(57) ABSTRACT

To provide a means by which an electrical device such as a lithium ion secondary battery that has a positive electrode using a solid solution positive electrode active material can be provided with satisfactory performance in terms of rate characteristics while sufficiently making use of the high capacity characteristics that characterize solid solution positive electrode active materials.

An electrical device that has a power generating element containing a positive electrode in which a positive electrode active material layer containing a positive electrode active material is formed on the surface of a positive electrode current collector, a negative electrode in which a negative electrode active material layer containing a negative electrode active material is formed on the surface of a negative electrode current collector, and a separator, in which the coating amount of the negative electrode active material layer is 3 to 11 mg/cm$^2$, the negative electrode active material layer contains the negative electrode active material represented by the formula (1), the positive electrode active material layer contains the positive electrode active material represented by the formula (2) (solid solution positive electrode active material), and, as a solid solution positive electrode active material to be contained in the positive
(Continued)

electrode active material layer, the material having composition represented by the formula (3) is used.

6 Claims, 4 Drawing Sheets

(51) Int. Cl.
    *H01M 4/505*     (2010.01)
    *H01M 4/38*     (2006.01)
    *H01M 10/0525*     (2010.01)
    *H01M 4/131*     (2010.01)
    *H01M 4/133*     (2010.01)
    *H01M 4/134*     (2010.01)
    *H01M 4/36*     (2006.01)
    *H01M 10/052*     (2010.01)
    *C01G 45/12*     (2006.01)
    *C01G 53/00*     (2006.01)
    *H01M 4/02*     (2006.01)

(52) U.S. Cl.
    CPC ........... *H01M 4/131* (2013.01); *H01M 4/133* (2013.01); *H01M 4/134* (2013.01); *H01M 4/364* (2013.01); *H01M 4/386* (2013.01); *H01M 4/505* (2013.01); *H01M 4/587* (2013.01); *H01M 10/052* (2013.01); *H01M 10/0525* (2013.01); *C01P 2002/72* (2013.01); *C01P 2006/40* (2013.01); *H01M 2004/021* (2013.01); *H01M 2220/20* (2013.01)

(58) Field of Classification Search
    CPC ................ H01M 4/525; H01M 4/587; H01M 2004/021; H01M 10/052; H01M 10/0525; H01M 2220/20; C01G 53/44; C01G 45/1228; C01P 2002/72; C01P 2006/40
    See application file for complete search history.

(56) References Cited

OTHER PUBLICATIONS

U.S. Appl. No. 15/113,096, filed Jul. 21, 2016, Nissan Motor Co., Ltd.
U.S. Appl. No. 15/113,503, filed Jul. 22, 2016, Nissan Motor Co., Ltd.

ELECTRICAL DEVICE

TECHNICAL FIELD

The present invention relates to an electrical device. The electrical device according to the present invention is used for a driving power source or an auxiliary power source of a motor serving as, for example, a secondary battery or a capacitor for use in a vehicle such as an electric vehicle, a fuel cell vehicle, or a hybrid electric vehicle.

BACKGROUND ART

Recently, there has been a strong demand for reduction of the amount of carbon dioxide in order to deal with global warming. In the automobile industry, the reduction of emissions of carbon dioxide is highly expected in association with the spread of electric vehicles (EV) and hybrid electric vehicles (HEV). Thus, development of electrical devices such as secondary batteries for driving motors as a key to practical application of such vehicles is actively being carried out.

The secondary batteries for driving motors are required to have quite high output performance and high energy as compared with lithium ion secondary batteries for general use in mobile phones, laptop computers and the like. Therefore, lithium ion secondary batteries having the highest theoretical energy among all types of batteries are gaining more attention, and they are now being rapidly developed.

A lithium ion secondary battery generally has a constitution in which a positive electrode including a positive electrode current collector to which a positive electrode active material and the like is applied on both surfaces with use of a binder is connected, via an electrolyte layer, to a negative electrode including a negative electrode current collector to which a negative electrode active material and the like is applied on both surfaces with use of a binder, and the battery is housed in a battery case.

In a lithium ion secondary battery of a related art, a carbon • graphite-based material, which is advantageous in terms of charge and discharge cycle life or cost, has been used for the negative electrode. However, the carbon • graphite-based negative electrode material has the disadvantage that a theoretical charge and discharge capacity equal to or larger than 372 mAh/g, which is obtained from $LiC_6$ as a compound introduced with maximum amount of lithium, cannot be ensured because the battery is charged and discharged by absorbing lithium ions into graphite crystals and desorbing the lithium ions therefrom. Thus, by use of the carbon • graphite-based negative electrode material, it is difficult to ensure a capacity and energy density that are high enough to satisfy vehicle usage on the practical level.

On the other hand, a battery using a $SiO_x$ (0<x<2) material, which can form a compound with Li, for a negative electrode has a higher energy density than the carbon • graphite-based negative electrode material of a related art. Therefore, such a negative electrode material is highly expected to be used for a battery in a vehicle. For example, in silicon oxide having a chemical composition of $SiO_x$, Si (nanoparticles of monocrystal) and non-crystalline (amorphous) $SiO_2$ are present as separate phases when it is observed at microscopic level.

The silicon oxide has a tetrahedral structure as a unit structure. Silicon compounds other than $SiO_2$ (intermediate oxide) can be expressed as $Si_2O$, $SiO$, or $Si_2O_3$ corresponding to oxygen number of 1, 2, or 3 at the corner of the tetrahedron. However, as these intermediate oxides are thermodynamically unstable, it is very difficult for them to be present as a monocrystal. Thus, SiO has a non-crystalline structure in which the unit structures are randomly arranged, and such a non-crystalline structure is formed such that plural non-crystalline compounds are present without forming an interface, and it is mainly composed of a homogeneous non-crystalline structure part. Thus, SiO has a structure in which Si nanoparticles are dispersed in non-crystalline $SiO_2$.

In the case of such $SiO_x$, only Si is involved with charging and discharging, and $SiO_2$ is not involved with charging and discharging. Thus, $SiO_x$ indicates average composition of them. In $SiO_x$, while 1 mol of Si absorbs and desorbs 4.4 mol of lithium ions in accordance with the reaction formula (A) and a reversible capacity component of $Li_{22}Si_5$ (=$Li_{4.4}Si$) with a theoretical capacity of 4200 mAh/g is generated, there is a significant problem that, when 1 mol of a SiO absorbs and desorbs 4.3 mol of lithium ions in accordance with the reaction formula (B), $Li_4SiO_4$ as a cause of having irreversible capacity is generated together with $Li_{4.4}Si$ during initial Li absorption.

[Chem. 1]

$$Si + 4.4Li^+ + e^- \Leftrightarrow Li_{4.4}Si \qquad (A)$$

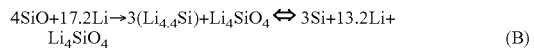

$$4SiO + 17.2Li \rightarrow 3(Li_{4.4}Si) + Li_4SiO_4 \Leftrightarrow 3Si + 13.2Li + Li_4SiO_4 \qquad (B)$$

Meanwhile, examples of a lithium silicate compound containing Li include $Li_ySiO_x$ (0<y, 0<x<2) such as $Li_4SiO_4$, $Li_2SiO_3$, $Li_2Si_2O_5$, $Li_2Si_3O_3$, and $Li_5Si_4O_{11}$. However, since these $Li_ySiO_x$ have very small electron conductivity and $SiO_2$ has no electron conductivity, there is a problem of having increased negative electrode resistance. As a result, it becomes very difficult for lithium ions to get desorbed from a negative electrode active material or get absorbed into a negative electrode active material.

However, in a lithium ion secondary battery using the material alloyed with Li for the negative electrode, expansion-shrinkage in the negative electrode is large at the time of charging and discharging. For example, volumetric expansion of the graphite material in the case of absorbing Li ions is approximately 1.2 times. However, the Si material has a problem of a decrease in cycle life of the electrode due to a large volumetric change (approximately 4 times) which is caused by transition from an amorphous state to a crystal state when Si is alloyed with Li. In addition, when using the Si negative electrode active material, the battery capacity has a trade-off relationship with cycle durability. Thus, there has been a problem that it is difficult to increase the capacity and improve the cycle durability concurrently.

In order to deal with the problems described above, there is known a negative electrode for a lithium ion secondary battery containing $SiO_x$ and a graphite material (for example, see Patent Literature 1). According to the invention described in the Patent Literature 1, it is described in paragraph [0018] that, by having $SiO_x$ at minimum content, not only the high capacity but also good cycle lifetime can be exhibited.

CITATION LIST

Patent Literature

Patent Literature 1: JP 2009-517850 W

SUMMARY OF THE INVENTION

Technical Problem

The lithium ion secondary battery of the Patent Literature 1, which uses a negative electrode containing $SiO_x$ and a carbon material, is described to exhibit good cycle properties. However, according to research by the present inventors, it was found that, when such a negative electrode is combined with a positive electrode using a solid solution positive electrode active material, the high capacity property as a characteristic of a solid solution positive electrode active material are not fully exhibited and also, in terms of rate property, it is difficult to have performances at sufficient level.

Accordingly, an object of the present invention is to provide a means such that an electrical device such as a lithium ion secondary battery that has a positive electrode using a solid solution positive electrode active material can be provided with satisfactory performance in terms of rate property while the high capacity property as a characteristic of a solid solution positive electrode active material is sufficiently exhibited.

The present inventors conducted intensive studies to solve the aforementioned problems. As a result, they found that, when a negative electrode containing a negative electrode active material obtained by mixing a Si-containing alloy with a carbon material and a positive electrode containing a Mn-containing solid solution positive electrode active material obtained by replacing Mn with a predetermined element are used and a coating amount (weight per unit area) of the negative electrode active material layer is controlled to a predetermined value, the aforementioned problem can be solved. The present invention is completed accordingly.

Namely, the present invention relates to an electrical device that has a power generating element containing the following: a positive electrode in which a positive electrode active material layer containing a positive electrode active material is formed on the surface of a positive electrode current collector, a negative electrode in which a negative electrode active material layer containing a negative electrode active material is formed on the surface of a negative electrode current collector, and a separator.

Furthermore, the coating amount of the negative electrode active material layer is 3 to 11 mg/cm². Furthermore, the negative electrode active material layer contains a negative electrode active material which is represented by the following formula (1).

[Mathematical formula 1]

$$\alpha(\text{Si-containing alloy}) + \beta(\text{carbon material}) \quad (1)$$

In the formula, $\alpha$ and $\beta$ represent % by weight of each component in the negative electrode active material layer, and $80 \le \alpha + \beta \le 98$, $3 \le \alpha \le 40$, and $40 \le \beta \le 95$.

Furthermore, the positive electrode active material layer contains a positive electrode active material which is represented by the following formula (2).

[Mathematical formula 2]

$$e \text{ (solid solution positive electrode active material)} \quad (2)$$

In the formula, e represents % by weight of each component in the positive electrode active material layer, and $80 \le e \le 98$.

[Mathematical formula 3]

$$Li_{1.5}[Ni_a Mn_b Co_c [Li]_d [X]_e]O_z \quad (3)$$

In the formula, X is at least one selected from a group consisting of Ti, Zr, and Nb, $0.01 \le e \le 0.4$, $a+b+c+d+e=1.5$, $0.1 \le d \le 0.4$, and $1.1 \le [a+b+c+e] \le 1.4$, and z represents an oxygen number for satisfying the atomic valence.

Effects of the Invention

According to the present invention, an effect of significantly reducing a decrease in initial discharge capacity, which is caused by initial irreversible capacity of a negative electrode active material, can be obtained by using a solid solution material with predetermined composition as a positive electrode active material. As a result, according to the electrical device of the present invention, satisfactory performance can be obtained in terms of rate property while the high capacity property as a characteristic of a solid solution positive electrode active material is sufficiently expressed.

DESCRIPTION OF EMBODIMENTS

Figure 1:
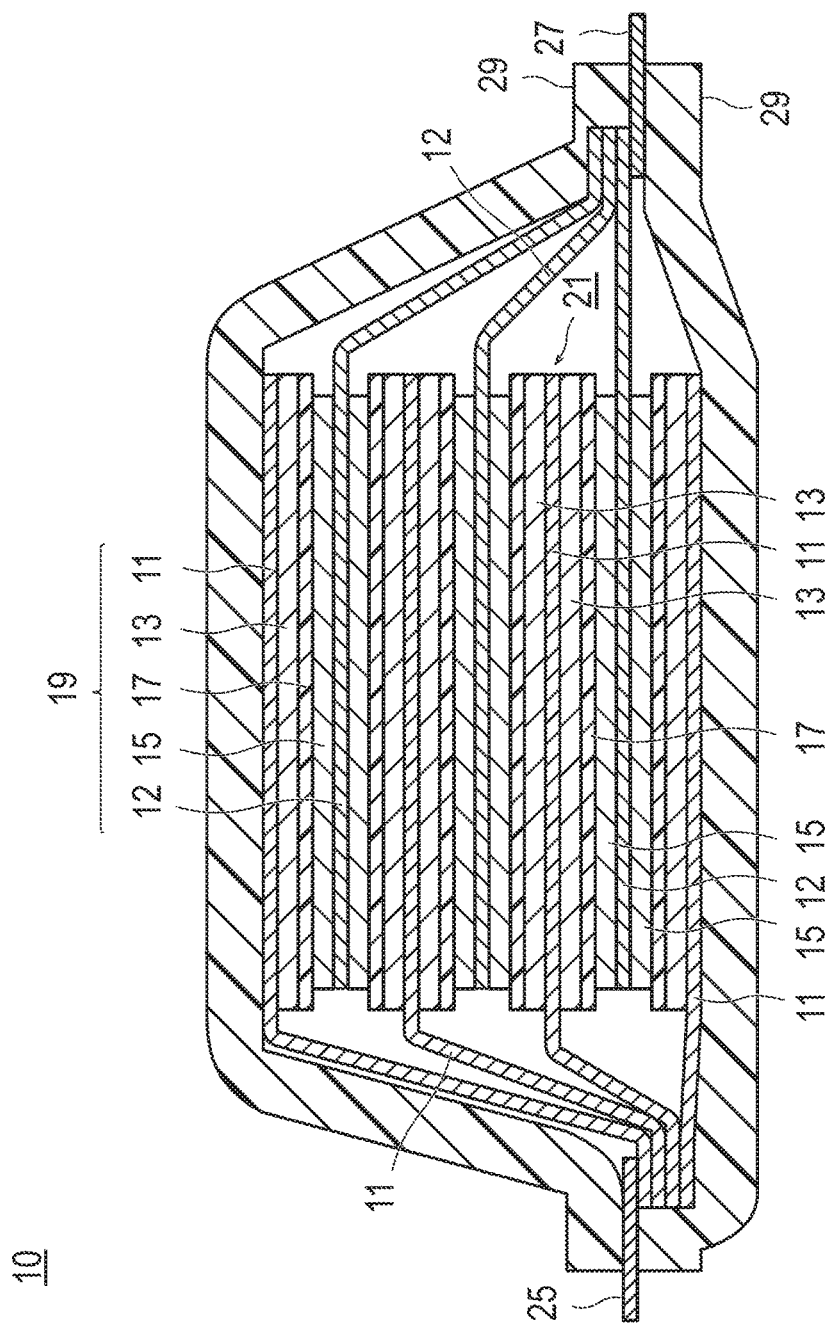
FIG. 1 is a schematic cross-sectional view illustrating the basic structure of anon-aqueous electrolyte lithium ion secondary battery, which is flat type (stack type) and not a bipolar type, as one embodiment of the electrical device according to the present invention.

According to an embodiment of the present invention, there is provided an electrical device which includes a power generating element containing a positive electrode in which a positive electrode active material layer containing a positive electrode active material is formed on the surface of a positive electrode current collector, a negative electrode in which a negative electrode active material layer containing a negative electrode active material is formed on the surface of a negative electrode current collector, and a separator, wherein the coating amount of the negative electrode active material layer is 3 to 11 mg/cm², the negative electrode active material layer contains a negative electrode active material which is represented by the following formula (1):

[Mathematical formula 4]

$$\alpha(\text{Si-containing alloy}) + \beta(\text{carbon material}) \quad (1)$$

in the formula, $\alpha$ and $\beta$ represent % by weight of each component in the negative electrode active material layer, and $80 \le \alpha + \beta \le 98$, $3 \le \alpha \le 40$, and $40 \le \beta \le 95$, the positive electrode active material layer contains a positive electrode active material which is represented by the following formula (2):

[Mathematical formula 5]

$$e \text{ (solid solution positive electrode active material)} \quad (2)$$

in the formula, e represents % by weight of each component in the positive electrode active material layer, and $80 \leq e \leq 98$, and the solid solution positive electrode active material has a composition which is represented by the following formula (3):

[Mathematical formula 6]

$$Li_{1.5}[Ni_aMn_bCo_c[Li]_d[X]_e]O_z \quad (3)$$

in the formula, X is at least one selected from a group consisting of Ti, Zr, and Nb, $0.01 \leq e \leq 0.4$, $a+b+c+d+e=1.5$, $0.1 \leq d \leq 0.4$, and $1.1 \leq [a+b+c+e] \leq 1.4$, and z represents an oxygen number for satisfying the atomic valence.

Hereinbelow, the basic structure of the electrical device according to the present invention is described. In this embodiment, descriptions are given by exemplifying a lithium ion secondary battery as an electrical device.

First, because a lithium ion secondary battery obtained by using the electrical device according to the present invention has large cell (single battery layer) voltage so that high energy density and high output density can be achieved. Thus, the lithium ion secondary battery of this embodiment is suitable for a driving power source or an auxiliary power source for a vehicle. Accordingly, it can be desirably used as a lithium ion secondary battery for a driving power source and the like for use in a vehicle. Further, it can be applied appropriately to lithium ion secondary batteries for mobile devices such as mobile phones.

For example, when the lithium ion secondary battery is classified in terms of the shape and structure, the lithium ion secondary battery may be applicable to any batteries having known shapes and structures such as a laminate type (flat) battery and a wound type (cylindrical) battery. The structure of the laminate type (flat) battery contributes to ensuring long-term reliability by a simple sealing technology such as simple thermo-compression bonding, and therefore it has the advantage in terms of cost and workability.

Furthermore, in terms of electrical connection (electrode structure) inside the lithium ion secondary battery, the lithium ion secondary battery may be applicable not only to a non-bipolar (internal parallel connection type) battery but also to a bipolar (internal serial connection type) battery.

When the lithium ion secondary battery is classified in terms of the type of an electrolyte layer used therein, the lithium ion secondary battery may be applicable to batteries including various types of known electrolyte layers such as a solution electrolyte type battery in which a solution electrolyte such as a non-aqueous electrolyte solution is used for an electrolyte layer and a polymer battery in which a polymer electrolyte is used for an electrolyte layer. The polymer battery is classified into a gel electrolyte type battery using a polymer gel electrolyte (also simply referred to as a gel electrolyte) and a solid polymer (all solid state) type battery using a polymer solid electrolyte (also simply referred to as a polymer electrolyte).

Therefore, in the following descriptions, as an example of a lithium ion secondary battery according to this embodiment, a non-bipolar (internal parallel connection type) lithium ion secondary battery will be described briefly with reference to the drawings. However, the technical scope of the electrical device according to the present invention and lithium ion secondary battery according to this embodiment should not be limited to the following descriptions.

<Overall Structure of Battery>

FIG. 1 is a schematic cross-sectional view showing the entire configuration of a flat (laminate type) lithium ion secondary battery (hereinafter, also simply referred to as a "laminate type battery") which is one representative embodiment of the electrical device according to the present invention.

As shown in FIG. 1, a laminate type battery 10 according to this embodiment has a configuration in which a substantially rectangular power generating element 21, in which a charging and discharging reaction actually progresses, is sealed inside a laminated sheet 29 as a battery outer casing. The power generating element 21 has a configuration in which a positive electrode having a positive electrode active material layer 13 provided on both surfaces of a positive electrode current collector 11, electrolyte layers 17, and a negative electrode having a negative electrode active material layer 15 provided on both surfaces of a negative electrode current collector 12 are laminated. Specifically, the positive electrode, the electrolyte layer, and the negative electrode are laminated in this order such that one positive electrode active material layer 13 faces an adjacent negative electrode active material layer 15 with the electrolyte layer 17 interposed therebetween.

Accordingly, the positive electrode, the electrolyte layer, and the negative electrode that are adjacent to one another constitute a single battery layer 19. Thus, it can be also said that the laminate type battery 10 shown in FIG. 1 has a configuration in which the plural single battery layers 19 are laminated so as to be electrically connected in parallel. Meanwhile, although the outermost positive electrode current collector located on both outermost layers of the power generating element 21 is provided with the positive electrode active material layer 13 only on one side thereof, the outermost positive electrode current collector may be provided with the active material layer on both sides thereof. That is, it is not limited to a current collector having an active material layer formed only on one surface to be used exclusively for the outermost layer, and a current collector provided with the active material layers on both sides thereof may be also used by itself. Furthermore, it is also possible that, by reversing the arrangement of the positive electrode and the negative electrode shown in FIG. 1, the outermost negative electrode current collector is present on both outermost sides of the power generating element 21 and the negative electrode active material layer is arranged on a single side or both sides of the corresponding outermost negative electrode current collector.

A positive electrode current collecting plate 25 and a negative electrode current collecting plate 27 which are electrically conductive to the respective electrodes (the positive electrodes and the negative electrodes) are attached to the positive electrode current collector 11 and the negative electrode current collector 12, respectively. The positive electrode current collecting plate 25 and the negative electrode current collecting plate 27 are held by being inserted between the respective end portions of the laminated sheet 29 and exposed to the outside of the laminated sheet 29. The positive electrode current collecting plate 25 and the negative electrode current collecting plate 27 may be attached to the positive electrode current collector 11 and the negative electrode current collector 12 of the respective electrodes via a positive electrode lead and a negative electrode lead (not shown in the figure) as appropriate by, for example, ultrasonic welding or resistance welding.

The lithium ion secondary battery according to this embodiment is characterized by the structure of the positive electrode and negative electrode. Main constituent members of the battery including the positive electrode and negative electrode will be described below.

<Active Material Layer>

The active material layer (13, 15) contains an active material and it contains, if necessary, other additives.

[Positive Electrode Active Material Layer]

The positive electrode active material layer 13 contains a positive electrode active material which contains at least a solid solution material (herein, it may be also described as a "solid solution positive electrode active material").

(Solid Solution Positive Electrode Active Material)

The solid solution positive electrode active material has composition which is represented by the following formula (3).

[Mathematical formula 7]

$$Li_{1.5}[Ni_aMn_bCo_c[Li]_d[X]_e]O_z \qquad (3)$$

In the formula (3), X is at least one selected from a group consisting of Ti, Zr, and Nb, $0.01 \leq e \leq 0.4$, $a+b+c+d+e=1.5$, $0.1 \leq d \leq 0.4$, and $1.1 \leq [a+b+c+e] \leq 1.4$, and z represents an oxygen number for satisfying the atomic valence.

Moreover, the solid solution positive electrode active material above preferably has diffraction peaks indicating a rock salt type layered structure at 20 to 23°, 35 to 40° (101), 42 to 45° (104) and 64 to 65° (108)/65 to 66° (110) in the X ray diffraction (XRD) measurement. In this case, in order to certainly obtain an effect of improving the cycle property, it is preferable that the positive electrode active material does not substantially have a peak other than the diffraction peak attributed to the rock salt type layered structure. More preferably, the positive electrode active material has three diffraction peaks at 35 to 40° (101) and one diffraction peak at 42 to 45° (104). However, each of the diffraction peaks may not necessarily be counted as the three peeks and the one peak as long as it is attributed to the diffraction peak of the rock salt type layered structure. The measuring method to be described in Examples below is employed for the X ray diffraction measurement. Incidentally, the notation of 64 to 65° (108)/65 to 66° (110) is intended to include a case in which there are two close peaks at 64 to 65 and 65 to 66 and thus the two close peaks are not clearly separated but present as one broad peak depending on the composition.

The solid solution positive electrode active material having composition represented by the composition formula (3) preferably has a plurality of specific diffraction peaks in the X ray diffraction (XRD) measurement. The solid solution positive electrode active material with above composition formula is a solid solution system of $Li_2MnO_3$ and $LiMnO_2$, and the diffraction peak at 20 to 23° is a super lattice diffraction peak that is characteristic for $Li_2MnO_3$ among the plurality of diffraction peaks specified above. In addition, the diffraction peaks at 36.5 to 37.5° (101), 44 to 45° (104) and 64 to 65° (108)/65 to 66° (110) are usually the peaks that are characteristic for the rock salt type layered structure of $LiMnO_2$. In addition, in this embodiment, it is preferable to have three diffraction peaks at 35 to 40° (101) and one diffraction peak at 42 to 45° (104) as a part of the diffraction peaks indicating the rock salt type layered structure. It is preferable that a material which has a peak other than the diffraction peaks indicating the rock salt type layered structure, for example, another peak derived from impurities or the like in these angle ranges is not contained in the solid solution positive electrode active material of this embodiment. The presence of such another peak means that a structure other than the rock salt type layered structure is included in the positive electrode active material. An effect of improving the cycle property can be more certainly obtained when a structure other than the rock salt type layered structure is not included.

It is considered that, in the positive electrode active material of this embodiment, at least one kind of Ti, Zr, and Nb is incorporated into the transition metal layer including Ni, Co and Mn by substituting $Mn^{4+}$, thereby forming the rock salt type layered structure. It is considered that the crystal structure is stabilized by the incorporation of solid solution of at least one kind of Ti, Zr, and Nb and thus the dissolution of the transition metal including Mn is suppressed during charging and discharging. As a result, a decrease in the capacity of the battery is prevented despite repeated charging and discharging and excellent cycle property can be realized. In addition, it is also possible to achieve the improvement in battery performance itself and durability. The spinel phase is usually formed when the rock salt type layered structure is changed by the dissolution of Mn and the diffraction peaks in the X ray diffraction (XRD) measurement of the positive electrode active material represent the spinel phase. The diffraction peaks for the spinel phase appear at 35 to 36° (101) and 42.5 to 43.5° (104). It is considered that, in the solid solution positive electrode active material of this embodiment, the spinel phase is not formed even after repeated charging and discharging but the rock salt type layered structure is maintained. However, this embodiment is not limited to the consideration described above.

Moreover, it is preferable that the diffraction peaks indicating the rock salt type layered structure in this embodiment be shifted to a lower angle side. In other words, the solid solution positive electrode active material of this embodiment has the diffraction peaks at 20 to 23°, 35.5 to 36.5° (101), 43.5 to 44.5° (104) and 64 to 65° (108)/65 to 66° (110) in the X ray diffraction (XRD) measurement. The shift of the diffraction peaks to a lower angle side indicates that more Ti and the like are incorporated as solid solution into the positive electrode active material to substitute Mn, and thus the effect of suppressing the dissolution of Mn is considered to be higher.

Furthermore, the covalent bonding between the substituting element and oxygen becomes stronger and the dislocation of oxygen in the crystal lattice associated with the oxidation of the transition metal may be diminished as Ti and the like are incorporated as a solid solution into the transition metal layer of the positive electrode active material by substituting $Mn^{4+}$. This makes it possible to suppress the generation of oxygen gas and to decrease the oxygen defect in the crystal structure.

Herein, in the composition formula (3), a+b+c+e satisfies $1.1 \leq [a+b+c+e] \leq 1.4$. In general, nickel (Ni), cobalt (Co) and manganese (Mn) have been known to contribute to the capacity property and the output property from the viewpoint of improving the purity of materials and the electron conductivity. Ti and the like substitute a part of Mn in the crystal lattice. In addition, it is possible to optimize each element and to improve further the capacity property and the output property when $1.1 \leq [a+b+c+e] \leq 1.2$ is satisfied. Consequently, it is possible to have excellent initial charging and discharging efficiency while maintaining a high capacity by maintaining a high reversible capacity in the case of using a positive electrode active material which satisfies this relationship in an electrical device such as the lithium ion secondary battery.

Incidentally, in the composition formula (3), the values of a, b and c are not particularly limited as long as the relationships of a+b+c+d+e=1.5 and $1.1 \leq [a+b+c+e] \leq 1.4$ are satisfied. However, a preferably satisfies $0 < a < 1.5$ and more preferably 0.1≤a≤0.75. A secondary battery exhibiting a superior capacity retention rate is obtained when a is in the range described above. Meanwhile, nickel is contained in the positive electrode active material within the range of d described above on the condition that nickel (Ni) is divalent in a case in which a does not satisfy a≤0.75, and thus the crystal structure is not stabilized in some cases. On the other hand, the crystal structure of the positive electrode active material is likely to be the rock salt type layered structure in a case in which a≤0.75 is satisfied.

Furthermore, in the composition formula (3), b preferably satisfies 0<b<1.5 and more preferably 0.2≤b≤0.9. An electrical device exhibiting a superior capacity retention rate is obtained when b is in the above range. However, manganese is contained in the positive electrode active material within the range of d described above on the condition that manganese is tetravalent in a case in which b does not satisfy b≤0.9 and further nickel (Ni) is contained in the positive electrode active material, thus the crystal structure is not stabilized in some cases. On the other hand, the crystal structure of the positive electrode active material is likely to be the rock salt type layered structure in a case in which b≤0.9 is satisfied.

In addition, in the composition formula (3), c preferably satisfies 0≤c<1.5. However, nickel and manganese are contained in the positive electrode active material within the range of d described above on the condition that cobalt is trivalent in a case in which c does not satisfy c≤0.6. Moreover, cobalt (Co) is contained in the positive electrode active material within the range of d described above on the condition that nickel (Ni) is divalent and manganese (Mn) is tetravalent. For this reason, the crystal structure of the positive electrode active material is not stabilized in some cases. On the other hand, the crystal structure of the positive electrode active material is likely to be the rock salt type layered structure in a case in which c≤0.6 is satisfied.

Moreover, in the composition formula (3), a+b+c+d+e=1.5 is satisfied. It is possible to stabilize the crystal structure of the positive electrode active material by satisfying this formula.

Furthermore, in the composition formula (3), 0.1≤d≤0.4 is satisfied. The crystal structure of the positive electrode active material may not be stabilized in a case in which d does not satisfy 0.1≤d≤0.4. On the other hand, the positive electrode active material is likely to have the rock salt type layered structure in a case in which d satisfies 0.1≤d≤0.4. The range of d is more preferably 0.15≤d≤0.35. It is preferable that d is 0.1 or more since the composition is unlikely to be close to $Li_2MnO_3$ and thus charging and discharging are facilitated.

In addition, in the composition formula (3), 0.01≤e≤0.4 is satisfied. The element cannot be uniformly incorporated as a solid solution into the crystal structure and thus the stabilization of crystal structure is not achieved in a case in which e does not satisfy 0.01≤e≤0.4. On the other hand, at least one kind of Ti, Zr, and Nb can substitute $Mn^{4+}$ enough to suppress its dissolution when e satisfies 0.01≤e≤0.4. It is more preferable that e satisfies 0.02≤e≤0.3. It is even more preferable that e satisfies 0.025≤e≤0.25, and it is particularly preferable that e satisfies 0.03≤e≤0.2.

The ionic radius of each element is as follows: $Mn^{4+}$ 0.54 Å, $Mn^{4+}$ 0.54 Å, $Ti^{4+}$ 0.61 Å, $Zr^{4+}$ 0.72 Å and $Nb^{5+}$ 0.64 Å, and the ionic radius of Ti, Zr, and Nb are greater than Mn. Hence, the crystal lattice expands and the diffraction peak indicating the rock salt type layered structure shifts to a lower angle side as $Mn^{4+}$ in the positive electrode active material is substituted with Ti or the like. In contrast, the amount of $Mn^{4+}$ substituted with Ti or the like is greater as the diffraction peak shifts to the even lower angle side, and thus the crystal structure is easily stabilized. In other words, the dissolution of Mn during charging and discharging can be further suppressed and thus a decrease in the capacity of the electrical device can be more effectively prevented.

The specific surface area of the positive electrode active material is preferably 0.2 to 0.6 $m^2/g$ and more preferably 0.25 to 0.5 $m^2/g$. It is preferable that the specific surface area is 0.2 $m^2/g$ or more since a sufficient output of the battery may be obtained. On the other hand, it is preferable that the specific surface area is 0.6 $m^2/g$ or less since the dissolution of manganese may be further suppressed. Meanwhile, in the present specification, the value measured by the method described in Examples is employed as the value of specific surface area unless otherwise stated.

The average particle diameter of the positive electrode active material is preferably 10 to 20 μm and more preferably 12 to 18 μm. It is preferable that the average particle diameter is 10 μm or more since the dissolution of manganese may be suppressed. On the other hand, it is preferable that the average particle diameter is 20 μm or less since the foil breakage, clogging and the like may be suppressed in the process of coating on the current collector at the time of producing the positive electrode. Meanwhile, the value determined by the particle size distribution measuring apparatus for the laser diffraction and scattering method is employed as the average particle diameter. The average particle diameter can be measured, for example, by using a particle size distribution analyzer (Model LA-920) manufactured by HORIBA, Ltd.

The above solid solution positive electrode active material can be prepared by a method as described below. In other words, the method includes a first process of mixing a citrate salt of at least one kind of Ti, Zr, and Nb with an organic acid salt of a transition metal having a melting point of 100° C. to 350° C., a second process of melting the mixture obtained in the first process at 100° C. to 350° C., a third process of pyrolyzing the molten material obtained in the second process at a temperature equal to or higher than the melting point, and a fourth process of calcining the pyrolyzate obtained in the third process. Hereinafter, each process will be described.

First Process

In the first process, a citrate salt of at least one kind of Ti, Zr, and Nb and an organic acid salt of a transition metal having a melting point of 100° C. to 350° C. are mixed together. The citrate salt of at least one kind of Ti, Zr, and Nb is preferably mixed in the form of an aqueous solution of citrate complex. The aqueous solution of citrate complex of at least one kind of Ti, Zr, and Nb can be preferably prepared as follows, but the preparation method is not limited thereto.

Namely, anhydrous citric acid is dissolved in an organic solvent such as acetone, and an alkoxide of at least one kind of Ti, Zr, and Nb is added to this solution. In this case, the molar ratio of the at least one kind of Ti, Zr, and Nb to citric acid is preferably that (at least one kind of Ti, Zr, and Nb)/citric acid is 1/1 to 1/2. Precipitation occurs in the solution when the alkoxide is added, and the precipitate is filtered by suction. Subsequently, water is added to the precipitate thus obtained, and the mixture is stirred and dissolved while heating at 50 to 60° C. The amount of water is appropriately adjusted such that the concentration of the aqueous solution of citrate complex is finally 1 to 10% by mass in terms of an oxide of at least one kind of Ti, Zr, and Nb. This aqueous solution is allowed to stand for one day and the precipitate is filtered, such that the aqueous solution of citrate complex of at least one kind of Ti, Zr, and Nb is obtained as the filtrate.

Examples of the alkoxide of at least one kind of Ti, Zr, and Nb may include titanium tetraisopropoxide, zirconium tetraisopropoxide, niobium isopropoxide, titanium ethoxide, titanium n-propoxide, titanium butoxide, zirconium ethoxide, zirconium n-propoxide, zirconium butoxide, niobium ethoxide, and niobium butoxide.

Next, an organic acid salt of a transition metal having a melting point of 100° C. to 350° C. is added to the aqueous solution of citrate complex of at least one kind of Ti, Zr, and Nb thus obtained to give a mixture. Preferred examples of the organic acid salt of a transition metal having a melting point of 100° C. to 350° C. may include nickel acetate, manganese acetate, cobalt acetate, and manganese citrate.

Preferably, the above aqueous solution of citrate complex of at least one kind of Ti, Zr, and Nb is further mixed with an organic acid salt of an alkali metal. Preferred examples of the organic acid salt of an alkali metal may include lithium acetate and lithium citrate. It is preferable that the organic acid salt of an alkali metal are mixed in this stage since the production method is simple.

Second Process

The mixture obtained in the first process is melted at 100° C. to 350° C. and preferably at 200° C. to 300° C.

Third Process

The molten material (slurry) obtained in the second process is pyrolyzed at a temperature equal to or higher than the melting point of the organic acid salt of a transition metal used in the first process to obtain a pyrolyzate as a dry powder. The pyrolysis is performed at a temperature equal to or higher than the highest melting point in a case in which the melting points of the plurality of organic acid salts of transition metals are different from one another. In greater detail, the molten material can be heated and sprayed at 200° C. to 600° C. and more preferably at 200° C. to 400° C. using a spray device.

Fourth Process

The pyrolyzate obtained in the third process is calcined at 600° C. to 1200° C. and more preferably at 800° C. to 1100° C. for 5 to 20 hours and preferably for 10 to 15 hours. Precalcination may be performed before the calcination. In that case, the precalcination can be performed at 200° C. to 700° C. and more preferably at 300° C. to 600° C. for 1 to 10 hours and more preferably for 2 to 6 hours. In this manner, the positive electrode active material of this embodiment can be obtained.

A positive electrode active material other than the aforementioned solid solution positive electrode active material may be combined together according to circumstances. In that case, in view of a capacity and output performance, the lithium-transition metal composite oxide is preferably used for the positive electrode active material. Note that other positive electrode active materials not listed above can, of course, be used instead. In the case when the respective active materials require different particle diameters in order to achieve their own appropriate effects, the active materials having different particle diameters may be selected and blended together so as to optimally function to achieve their own effects. Thus, it is not necessary to have uniform particle diameter of all of the active materials.

An average particle diameter of the positive electrode active material contained in the positive electrode active material layer 13 is not particularly limited; however, in view of higher output performance, the average particle diameter is preferably in the range from 1 µm to 30 µm, more preferably in the range from 5 µm to 20 µm. Note that, in the present specification, "the particle diameter" represents the maximum length between any two points on the circumference of the active material particle (the observed plane) observed by observation means such as a scanning electron microscope (SEM) and a transmission electron microscope (TEM). In addition, "the average particle diameter" represents a value calculated with the scanning electron microscope (SEM) or the transmission electron microscope (TEM) as an average value of particle diameters of the particles observed in several to several tens of fields of view. Particle diameters and average particle diameters of other constituents may also be determined in the same manner.

As described above, the positive electrode active material layer contains a positive electrode active material (solid solution positive electrode active material) which is represented by the following formula (2).

[Mathematical formula 8]

$$e \text{ (solid solution positive electrode active material)} \quad (2)$$

In the formula (2), e indicates % by weight of each component in the positive electrode active material layer, and it satisfies $80 \leq e \leq 98$.

As is evident from the formula (2), it is essential that the content of the solid solution positive electrode active material in the positive electrode active material layer is 80 to 98% by weight. However, it is preferably 84 to 98% by weight.

Furthermore, it is preferable that, in addition to the solid solution positive electrode active material layer described above, a binder and a conductive aid are contained in the positive electrode active material layer. Furthermore, if necessary, it may contain other additives including an electrolyte (for example, polymer matrix, ion conductive polymer, and electrolyte solution) and lithium salt for increasing ion conductivity.

(Binder)

The binder used in the positive electrode active material layer is not particularly limited. Examples of the binder include: a thermoplastic polymer such as polyethylene, polypropylene, polyethylene terephthalate (PET), polyethernitrile, polyacrylonitrile, polyimide, polyamide, cellulose, carboxymethyl cellulose (CMC) and a salt thereof, an ethylene-vinyl acetate copolymer, polyvinyl chloride, styrene butadiene rubber (SBR), isoprene rubber, butadiene rubber, ethylene propylene rubber, an ethylene propylene diene copolymer, a styrene-butadiene-styrene block copolymer and a hydrogen additive thereof, and a styrene-isoprenestyrene block copolymer and a hydrogen additive thereof; fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylenetetrafluoroethylene copolymer (ETFE), polychlorotrifluoroethylene (PCTFE), an ethylene-chlorotrifluoroethylene copolymer (ECTFE), and polyvinyl fluoride (PVF); vinyl idene fluoride fluoro rubber such as vinylidene fluoride-hexafluoropropylene fluoro rubber (VDF-HFP fluoro rubber), vinylidene fluoride-hexafluoropropylene-tetrafluoroethylene fluoro rubber (VDF-HFP-TFE fluoro rubber), vinylidene fluoride-pentafluoropropylene fluoro rubber (VDF-PFP fluoro rubber), vinylidene fluoride-pentafluoropropylene-tetrafluoroethylene fluoro rubber (VDF-PFP-TFE fluoro rubber), vinylidene fluoride-perfluoromethyl vinyl ether-tetrafluoroethylene fluoro rubber (VDF-PFMVE-TFE fluoro rubber), and vinylidene fluoride-chlorotrifluoroethylene fluoro rubber (VDF-CTFE fluoro rubber); and an epoxy resin. These binders may be used either singly or in combination of two or more types.

Content of the binder contained in the positive electrode active material layer is preferably 1 to 10% by weight, and more preferably 1 to 8% by weight.

(Conductive Aid)

The conductive aid is an additive to be mixed for improving conductivity of the positive electrode active material layer or negative electrode active material layer. Examples of the conductive aid include carbon black like Ketjen black and acetylene black. If the active material layer contains a conductive aid, the electron network in the inside of the active material layer is effectively formed, thereby contributing to the improvement of output property of a battery.

Content of the conductive aid in the positive electrode active material layer is preferably 1 to 10% by weight, and more preferably 1 to 8% by weight. As the blending ratio (content) of the conductive aid is defined in the aforementioned range, the following effects are exhibited. Namely, as the electron conductivity is sufficiently ensured without inhibiting an electrode reaction, a decrease in energy density caused by decreased electrode density can be suppressed, and also an increase in energy density based on improved electrode density can be obtained.

(Other Components)

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conducting polymer include a polyethylene oxide (PEO)-based polymer and a polypropylene oxide (PPO)-based polymer.

The positive electrode (positive electrode active material layer) may be formed by a method of applying (coating) ordinary slurry thereto, or by any of a kneading method, a sputtering method, a vapor deposition method, a CVD method, a PVD method, an ion plating method, and a thermal spraying method.

[Negative Electrode Active Material Layer]

The negative electrode active material layer 15 essentially contains, as a negative electrode active material, a Si-containing alloy and a carbon material.

(Si-Containing Alloy)

The Si-containing alloy is not particularly limited as long as it is an alloy with other metal containing Si, and reference can be suitably made to public knowledge of a related art. Herein, preferred examples of the Si-containing alloy include $Si_xTi_yGe_zA_a$, $Si_xTi_yZn_zA_a$, $Si_xTi_ySn_zA_a$, $Si_xSn_yAl_zA_a$, $Si_xSn_yV_zA_a$, $Si_xSn_yC_zA_a$, $Si_xZn_yV_zA_a$, $Si_xZn_ySn_zA_a$, $Si_xZn_yAl_zA_a$, $Si_xZn_yC_zA_a$, $Si_xAl_yC_zA_a$, and $Si_xAl_yNb_zA_a$ (in the formulae, A indicates an inevitable impurity, x, y, z and a represent values of % by weight and satisfy the conditions of $0<x<100$, $0<y<100$, $0<z<100$, $0\le a<0.5$, and $x+y+z+a=100$). By using those Si-containing alloys for the negative electrode active material and suitably selecting a predetermined first addition element and a predetermined second addition element, amorphous-crystal phase transition at the time of the alloying with Li can be suppressed so that the cycle lifetime can be extended. In addition, the negative electrode active material thus obtained has a higher capacity than conventional negative electrode active materials such as carbon-based negative electrode active materials.

It is sufficient that the average particle diameter of the Si-containing alloy is at the same level as the average particle diameter of the negative electrode active material to be contained in the negative electrode active material 15 of a related art, and it is not particularly limited. From the viewpoint of having high output, it is preferably in the range of 1 to 20 μm. However, it is never limited to the above range, and it is needless to say that it can be outside the above range as long as the working effect of this embodiment is effectively exhibited. Furthermore, the shape of the Si-containing alloy is not particularly limited, and examples thereof include a spherical shape, an elliptical shape, a column shape, a polygonal column shape, a flake shape, and an amorphous shape.

(Carbon Material)

The carbon material which may be used in the present invention is not particularly limited, and examples thereof include graphite, which is highly crystalline carbon, such as natural graphite or artificial graphite; low crystalline carbon such as soft carbon or hard carbon; carbon black such as Ketjen black, acetylene black, channel black, lamp black, oil furnace black, or thermal black; and a carbon material such as fullerene, carbon nanotube, carbon nanofiber, carbon nanohorn, or carbon fibril. Among them, it is preferable to use graphite.

According to this embodiment, as the carbon material is used as a negative electrode active material in combination with the above Si-containing alloy, high initial capacity can be obtained while maintaining higher cycle property and rate property, and thus balanced properties can be exhibited.

Furthermore, the average particle diameter of the carbon material is, although not particularly limited, preferably 5 to 25 μm, and more preferably 5 to 10 μm. Compared to the average particle diameter of the Si-containing alloy described above, the average particle diameter of the carbon material may be the same or different from that of the Si-containing alloy, but it is preferably different from that of the Si-containing alloy. In particular, it is more preferable that the average particle diameter of the Si-containing alloy is smaller than the average particle diameter of the carbon material. If the average particle diameter of the carbon material is relatively larger than the average particle diameter of the Si-containing alloy, it is possible to have a structure in which particles of the carbon material are evenly arranged and the Si-containing alloy is present among the particles of the carbon material, and thus the Si-containing alloy can be evenly arranged within the negative electrode active material layer.

According to circumstances, a negative electrode active material other than the two kinds of a negative electrode active material described above may be used in combination. Examples of the negative electrode active material which may be used in combination include $SiO_x$, a lithium-transition metal composite oxide (for example, $Li_4Ti_5O_{12}$), a metal material, and a lithium alloy-based negative electrode material. It is needless to say that a negative electrode active material other than those can be also used.

The negative electrode active material layer contains a negative electrode active material represented by the following formula (1).

[Mathematical formula 9]

$$\alpha \text{ (Si-containing alloy)} + \beta \text{ (carbon material)} \quad (1)$$

In the formula (1), α and β indicate % by weight of each component in the negative electrode active material layer, and they satisfy $80\le\alpha+\beta\le98$, $3\le\alpha\le40$, and $40\le\beta\le95$.

As it is evident from the formula (1), the content of the negative electrode active material consisting of Si-containing alloy is 3 to 40% by weight in the negative electrode active material layer. Furthermore, the content of the carbon material negative electrode active material is 40 to 95% by weight. Furthermore, the total content thereof is 80 to 98% by weight.

Incidentally, the mixing ratio of Si-containing alloy and carbon material as a negative electrode active material is not particularly limited as long as it satisfies the content requirement described above, and it can be suitably selected depending on desired use or the like. In particular, the content of the Si-containing alloy in the negative electrode active material is preferably 3 to 40% by weight. According to one embodiment, the content of the Si-containing alloy in the negative electrode active material is more preferably 4 to 30% by weight. According to another embodiment, the content of the Si-containing alloy in the negative electrode active material is more preferably 5 to 20% by weight.

When the content of the Si-containing alloy is 3% by weight or more, high initial capacity is obtained, and therefore desirable. On the other hand, when the content of the Si-containing alloy is 40% by weight or less, high cycle property is obtained, and therefore desirable.

According to this embodiment, the negative electrode active material layer preferably contains a binder and a conductive aid in addition to the negative electrode active material which is described above. In addition, if necessary, it further contains other additives including an electrolyte (for example, polymer matrix, ion conductive polymer, and electrolyte solution) and lithium salt for increasing ion conductivity. As for the specific type or preferred content of those additives in the negative electrode active material layer, those descriptions given in the above for describing the positive electrode active material layer can be similarly adopted, and thus detailed descriptions are omitted herein.

This embodiment is characterized in that the coating amount (weight per unit area) of a negative electrode active material layer is 3 to 11 mg/cm$^2$. When the coating amount (weight per unit area) of a negative electrode active material layer is more than 11 mg/cm$^2$, there is a problem that the rate property of a battery is significantly impaired. On the other hand, when the coating amount (weight per unit area) of a negative electrode active material layer is less than 3 mg/cm$^2$, content of the active material per se is low in the negative electrode active material layer, and an excessive load needs to be applied to a negative electrode active material layer to ensure sufficient capacity so that the cycle durability is impaired. On the other hand, if the coating amount (weight per unit area) of a negative electrode active material layer is a value within the aforementioned range, both the rate property and cycle property can be obtained simultaneously. Furthermore, according to the invention, the coating amount (weight per unit area) within the aforementioned can be achieved since a predetermined negative electrode active material layer is used in combination with adjusted content.

The thickness of each active material layer (active material layer on a single surface of a current collector) is not particularly limited either, and reference can be made to the already-known knowledge about a battery. For example, the thickness of each active material layer is generally about 1 to 500 µm, and preferably about 2 to 100 µm, considering the purpose of use (for example, focused on output or focused on energy, etc.), ion conductivity, or the like of a battery.

<Current Collector>

The current collector (11, 12) is made of an electrically conductive material. The size of the respective current collector may be determined depending on the intended use of the battery. For example, a current collector having a large area is used for a large size battery for which high energy density is required.

The thickness of the current collector is not particularly limited, either. The thickness of the current collector is generally about 1 µm to 100 µm.

The shape of the respective current collector is not particularly limited, either. The laminate type battery 10 shown in FIG. 1 may use, in addition to a current collecting foil, a mesh-shaped current collector (such as an expanded grid) or the like.

Meanwhile, a current collecting foil is preferably used when a thin film alloy as the negative electrode active material is directly formed on the negative electrode current collector 12 by a sputtering method.

The material forming the current collector is not particularly limited. For example, a metal or resin in which electrically conductive filler is added to an electrically conductive polymer material or a non-electrically conductive polymer material may be used.

Specific examples of the metal include aluminum, nickel, iron, stainless steel, titanium and copper. In addition, a clad metal of nickel and aluminum, a clad metal of copper and aluminum, or an alloyed material of these metals combined together, may be preferably used. A foil in which a metal surface is covered with aluminum may also be used. In particular, aluminum, stainless steel, copper and nickel are preferable in view of electron conductivity, battery action potential, and adhesion of the negative electrode active material to a current collector by sputtering.

Examples of the electrically conductive polymer material include polyaniline, polypyrrole, polythiophene, polyacetylene, polyparaphenylene, polyphenylene vinylene, polyacrylonitrile, and polyoxadiazole. These electrically conductive polymer materials have the advantage in simplification of the manufacturing process and lightness of the current collector, as they have sufficient electric conductivity even if an electrically conductive filler is not added thereto.

Examples of the non-electrically conductive polymer material include polyethylene (PE; such as high-density polyethylene (HDPE) and low-density polyethylene (LDPE)), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethylacrylate (PMA), polymethylmethacrylate (PMMA), polyvinyl chloride (PVC), polyvinylidenefluoride (PVdF), and polystyrene (PS). These non-electrically conductive polymer materials have high potential resistance or solvent resistance.

The above electrically conductive polymer material or the non-electrically conductive polymer material may include electrically conductive filler that is added as necessary. In particular, when the resin serving as a substrate of the current collector consists only of a non-electrically conductive polymer, the electrically conductive filler is essential to impart electric conductivity to the resin.

The electrically conductive filler is not particularly limited as long as it is a substance having electric conductivity. Examples of the material having high electric conductivity, potential resistance or lithium ion insulation characteristics, include metal and electrically conductive carbon. The metal is not particularly limited; however, the metal is preferably at least one element selected from the group consisting of Ni, Ti, Al, Cu, Pt, Fe, Cr, Sn, Zn, In, Sb, and K, or an alloy or metal oxide containing these metals. The electrically conductive carbon is not particularly limited; however, the electrically conductive carbon is preferably at least one material selected from the group consisting of acetylene black, Vulcan, Black Pearl, carbon nanofiber, Ketjen black, carbon nanotube, carbon nanohorn, carbon nanoballoon, and fullerene.

The addition amount of the electrically conductive filler is not particularly limited as long as it imparts sufficient electric conductivity to the current collectors. In general, the amount thereof is approximately 5 to 35% by weight.

<Separator (Electrolyte Layer)>

A separator has a function of maintaining an electrolyte to ensure lithium ion conductivity between a positive electrode and a negative electrode and also a function of a partition wall between a positive electrode and a negative electrode.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylidene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a monolayer or a multilayer. Fine pore diameter of the microporous (microporous membrane) separator is preferably 1 µm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Furthermore, the volume density of a non-woven fabric is not particularly limited as long as sufficient battery characteristics are obtained with an impregnated electrolyte. Furthermore, it is sufficient that the thickness of the non-woven separator is the same as that of an electrolyte layer. Preferably, it is 5 to 200 µm. Particularly preferably, it is 10 to 100 µm.

As described above, the separator also contains an electrolyte. The electrolyte is not particularly limited if it can exhibit those functions, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has an activity of a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethyl methyl carbonate. Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Use of a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator laminated with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing an impaired performance as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylronitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

Content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer is increased so that vibration resistance of a separator can be enhanced. On the other hand, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

<Current Collecting Plate (Tab)>

In the lithium ion secondary battery, a current collecting plate (tab) that is electrically connected to the current collector is taken out of the laminate film as an outer casing material for the purpose of drawing the current to the outside of the battery.

The material constituting the current collecting plate is not particularly limited and a known highly electrical conducting material which is used in the related art as a current collecting plate for lithium ion secondary battery may be used. Preferred examples of the constituent material of the current collecting plate may include a metal material such as aluminum, copper, titanium, nickel, stainless steel (SUS) and an alloy thereof. The material is more preferably aluminum and copper and particularly preferably aluminum from the viewpoint of lightweight, corrosion resistance and high electrical conductivity. Meanwhile, the same material or different materials may be used in the positive electrode current collecting plate (positive electrode tab) and the negative electrode current collecting plate (negative electrode tab).

Figure 2:
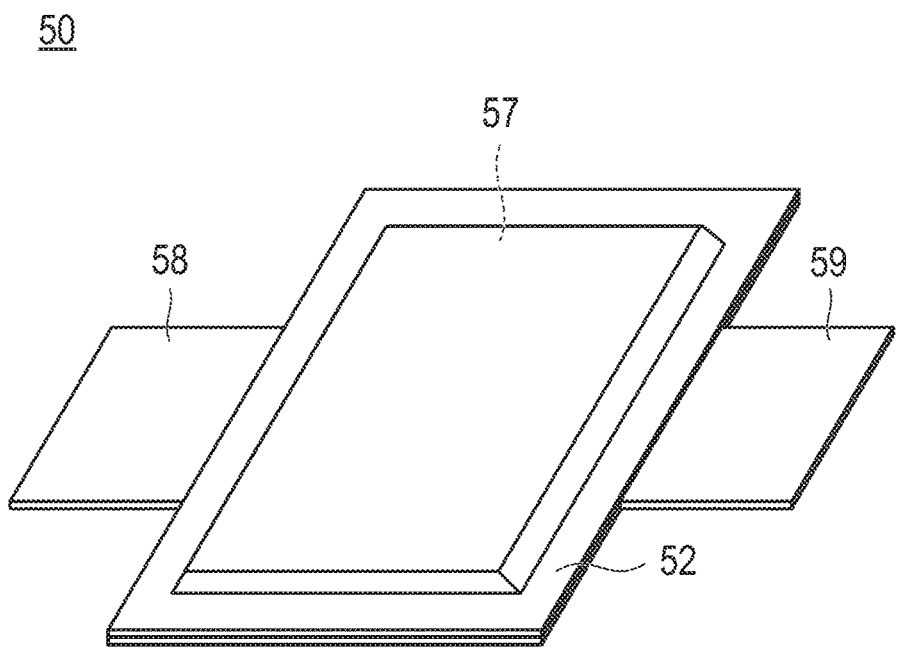
FIG. 2 is a perspective view illustrating an appearance of a flat lithium ion secondary battery, which is a typical embodiment of the electrical device according to the present invention.

The exposed state of the tabs 58 and 59 shown in FIG. 2 is not particularly limited. The positive electrode tab 58 and the negative electrode tab 59 may be taken out from the same side. Alternatively, the positive electrode tab 58 and the negative electrode tab 59 may each be divided into several pieces to be taken out separately from each side. Thus, the current collecting plates are not limited to the configuration shown in FIG. 2. In the wound lithium ion battery, a terminal may be formed by use of, for example, a cylinder can (metal can) in place of the tab.

<Seal Portion>

The seal portion is a unique member for the series laminate type battery and has a function to prevent the leakage of electrolyte layer. Furthermore, it is also possible to prevent the contact between adjacent current collectors in the battery or the short circuit caused by slight lack of uniformity of the ends of the laminated electrodes.

The constituting material for the seal portion is not particularly limited and a polyolefin resin such as polyethylene and polypropylene, an epoxy resin, rubber, polyimide and the like may be used. Among these, it is preferable to use a polyolefin resin from the viewpoint of corrosion resistance, chemical resistance, film forming property, economic efficiency and the like.

<Positive Electrode Terminal Lead and Negative Electrode Terminal Lead>

A known lead used in a laminate type secondary battery can be used as the material of the negative electrode and positive electrode terminal leads. Meanwhile, it is preferable to cover the part taken out from the outer casing material for battery with a thermal shrinkable tube exhibiting heat resistance and insulation so as not to affect the product (for example, automobile parts and especially electronic devices) by contact with a peripheral device or a wire causing the leakage of electricity.

<Outer Casing Material; Laminate Film>

As the outer casing material, it is possible to use a metal can case known in the related art. In addition, it is also possible to pack the power generating element 21 using the laminate film 29 illustrated in FIG. 1 as the outer casing material. The laminate film may be configured as a three-layer structure formed by laminating, for example, polypropylene, aluminum and nylon in this order. The use of such a laminate film makes it possible to easily perform opening of the outer casing material, addition of a capacity recovery material, and resealing of the outer casing material.

<Method for Producing Lithium Ion Secondary Battery>

The method for producing a lithium ion secondary battery is not particularly limited, and it may be produced by a known method. Specifically, the method includes (1) fabrication of the electrodes, (2) fabrication of the single battery layer, (3) fabrication of the power generating element, and (4) production of the laminate type battery. Hereinafter, the method for producing a lithium ion secondary battery will be described by taking an example but is not limited thereto.

(1) Fabrication of Electrode (Positive Electrode and Negative Electrode)

The electrode (positive electrode or negative electrode) may be fabricated, for example, by preparing an active material slurry (positive electrode active material slurry or negative electrode active material slurry), coating the active material slurry on a current collector, and drying and then pressing the resultant. The active material slurry contains the active material (positive electrode active material or negative electrode active material) described above, a binder, a conductive aid, and a solvent.

The solvent is not particularly limited, and N-methyl-2-pyrrolidone (NMP), dimethyl formamide, dimethyl acetamide, methyl formamide, cyclohexane, hexane, water and the like may be used.

The method for coating the active material slurry on the current collector is not particularly limited, and examples thereof may include a screen printing method, a spray coating method, an electrostatic spray coating method, an ink jet method, and a doctor blade method.

The method for drying the coating film formed on the surface of the current collector is not particularly limited as long as at least apart of the solvent in the coating film is removed. Examples of the drying method may include heating. The drying conditions (drying time, drying temperature and the like) may be appropriately set depending on the volatilization rate of the solvent contained in the active material slurry to be applied, the coating amount of the active material slurry and the like. Incidentally, a part of the solvent may remain. The remained solvent may be removed in the pressing process or the like to be described below.

The pressing means is not particularly limited, and for example, a calendar roll, a flat press and the like may be used.

(2) Fabrication of Single Battery Layer

The single battery layer may be fabricated by laminating the electrodes (positive electrode and negative electrode) fabricated in (1) via an electrolyte layer.

(3) Fabrication of Power Generating Element

The power generating element may be fabricated by laminating the single battery layers inappropriate consideration of the output and capacity of the single battery layer, and the output, capacity and the like that are required for a battery.

(4) Production of Laminate Type Battery

As the configuration of the battery, it is possible to employ various kinds of shapes such as a square shape, a paper type, a laminate type, a cylindrical type and a coin type. In addition, the current collector, an insulating plate and the like of the constituent components are not particularly limited and may be selected according to the above shape. However, a laminate type cell is preferred in this embodiment. In the laminate type battery, the lead is joined to the current collector of the power generating element obtained above and this positive electrode lead or negative electrode lead is joined to the positive electrode tab or the negative electrode tab. Thereafter, the power generating element is introduced into the laminate sheet such that the positive electrode tab and the negative electrode tab are exposed to the outside of the battery, the electrolyte solution is injected by a injecting machine, and the laminate sheet is sealed in a vacuum, such that the laminate type battery can be produced.

(5) Activation Treatment or the Like

In the present embodiment, it is preferable to further perform an initial charge treatment, a gas removing treatment, and an activation treatment under the following conditions from a viewpoint of improving performance and durability of the laminate type battery obtained above (refer to Example 1). In this case, in order to be able to perform the gas removing treatment, in the above (4) Production of laminate type battery, three sides of the laminate sheet (outer casing material) are completely sealed (main sealing) at the time of sealing by thermocompression bonding into a rectangular shape, and the remaining one side is temporarily sealed by thermocompression bonding. The remaining one side, for example, may be freely opened or closed by clipping or the like. However, it is preferable to temporarily seal the one side by thermocompression bonding from the viewpoint of mass production (production efficiency). This is because this case only requires adjusting the temperature and the pressure for bonding. When the side is temporarily sealed by thermocompression bonding, the side can be unsealed by applying a slight pressure. After degassing, the side may be temporarily sealed again by thermocompression bonding. Finally, the side can be completely sealed (main sealing) by thermocompression bonding.

(Initial Charge Treatment)

It is desirable to perform an aging treatment of the battery as follows. Charging is performed at 25° C. at 0.05 C for 4 hours (SOC: about 20%) by a constant current charging method. Subsequently, the battery is charged at 25° C. with rate of 0.1 C to 4.45 V. Thereafter, charging is stopped, and the battery is allowed to stand in the state (SOC: about 70%) about for two days (48 hours).

(Initial (First) Gas Removing Treatment)

Next, as the initial (first) gas removing treatment, the following treatment is performed. First, the one side temporarily sealed by thermocompression bonding is unsealed. Gas is removed at 10±3 hPa for five minutes. Thereafter, the one side is subjected to thermocompression bonding again to perform temporary sealing. In addition, pressure molding (contact pressure: 0.5±0.1 MPa) is performed using a roller to make the electrode adhere to the separator sufficiently.

(Activation Treatment)

Next, as the activation treatment method, the following electrochemical pretreatment method is performed.

First, two cycles of charging at 25° C. at 0.1 C until the voltage becomes 4.45 V by a constant current charging method and thereafter, discharging at 0.1 C to 2.0 V, are performed. Similarly, one cycle of charging at 25° C. at 0.1 C until the voltage becomes 4.55 V by a constant current charging method, and then discharging at 0.1 C to 2.0 V, and one cycle of charging at 0.1 C until the voltage becomes 4.65 V and thereafter, discharging at 0.1 C to 2.0 V, are performed. Furthermore, one cycle of charging at 25° C. at 0.1 C until the voltage becomes 4.75 V by a constant current charging method and then discharging at 0.1 C to 2.0 V, can be performed.

Here, as the activation treatment method, an electrochemical pretreatment method in which the constant current charging method is used and the voltage is used as a stop condition has been described as an example. However, as the charging method, a constant current constant voltage charging method may be used. In addition to the voltage, a charge amount or time may be employed as the stop condition.

(Last (Second) Gas Removing Treatment)

Next, as the last (second) gas removing treatment, the following treatment is performed. First, the one side temporarily sealed by thermocompression bonding is unsealed. Gas is removed at 10±3 hPa for five minutes. Thereafter, the one side is subjected to thermocompression bonding again to perform main sealing. In addition, pressure molding (contact pressure: 0.5±0.1 MPa) is performed using a roller to make the electrode adhere to the separator sufficiently.

In the present embodiment, it is possible to enhance performance and durability of the obtained battery by performing the above-described initial charge treatment, gas removing treatment, and activation treatment.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small size assembled battery by connecting plural batteries in series or in parallel. Furthermore, by connecting again plural detachable small size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small size assembled battery for fabricating an assembled battery with high capacity can be determined depending on the capacity or output of a battery of a vehicle (electric vehicle) for which the battery is loaded.

[Vehicle]

The lithium ion secondary battery according to the present embodiment can maintain discharge capacity even when it is used for a long period of time, and thus has good cycle characteristics. It also has high volume energy density. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. As such, the lithium ion secondary battery (electrical device) can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

Hereinbelow, more detailed descriptions are given in view of Examples and Comparative Examples, but the present invention is not limited to the Examples given below.

Example 1

Solid Solution Positive Electrode Active Material C1

(Preparation of Aqueous Solution of Titanium Citrate Complex)

To 400 ml of acetone, 60 g (0.3 mol) of anhydrous citric acid (molecular weight: 192.12 g/mol) was added and dissolved by heating at 60° C. Subsequently, 56 g (0.2 mol) of titanium tetraisopropoxide (molecular weight: 284.22 g/mol) was added to the mixture so as to cause precipitation. This solution was filtered by suction to obtain a precipitate (pale yellow).

The precipitate was added with $H_2O$ (200 ml) and dissolved by heating at 50 to 60° C. This solution was allowed to stand for one or more days to settle the insoluble matter and then filtered to remove the insoluble matter, thereby obtaining an aqueous solution of titanium citrate complex. The concentration of Ti was 5.0% by weight as $TiO_2$ (molecular weight: 79.87 g/mol).

(Preparation of Solid Solution Positive Electrode Active Material C1)

$Li_{1.5}[Ni_{0.450}Mn_{0.750}[Li]_{0.20}Ti_{0.10}]O_z$

To 15.97 g of the aqueous solution of titanium citrate complex (5.0% by weight as $TiO_2$), 14.71 g of manganese acetate tetrahydrate (molecular weight: 245.09 g/mol), 7.47 g of nickel acetate tetrahydrate (molecular weight: 248.84 g/mol) and 14.57 g of lithium acetate dihydrate (molecular weight: 102.02 g/mol) were added in order. The mixture thus obtained was heated to 200 to 300° C. for melting and dissolving. Next, the molten solution (slurry) thus obtained was heated and sprayed at 200 to 400° C. using a spray drying device and dried. The dry powder thus obtained was dried in vacuum for 12 hours at 140° C. to 250° C. followed by precalcination at 450° C. for 12 hours. It was then subjected to main calcination at 900° C. for 12 hours.

The composition of the solid solution positive electrode active material C1 obtained as described above was as follows.

Composition formula: $Li_{1.5}[Ni_{0.45}Mn_{0.750}[Li]_{0.20}Ti_{0.10}]O_z$ a+b+c+d+e=1.5, d=0.20, a+b+c+e=1.30, e=0.10

(X Ray Diffraction Measurement)

The crystal structure and crystallinity of the solid solution positive electrode active material thus obtained were evaluated by X ray diffraction. The Cu-Kα ray was used as the X ray source, and the measurement conditions were as follows. Tube voltage: 40 kV, tube current: 20 mA, scanning speed: 2°/min, divergence slit width: 0.5° and light-receiving slit width: 0.15°

Figure 3:
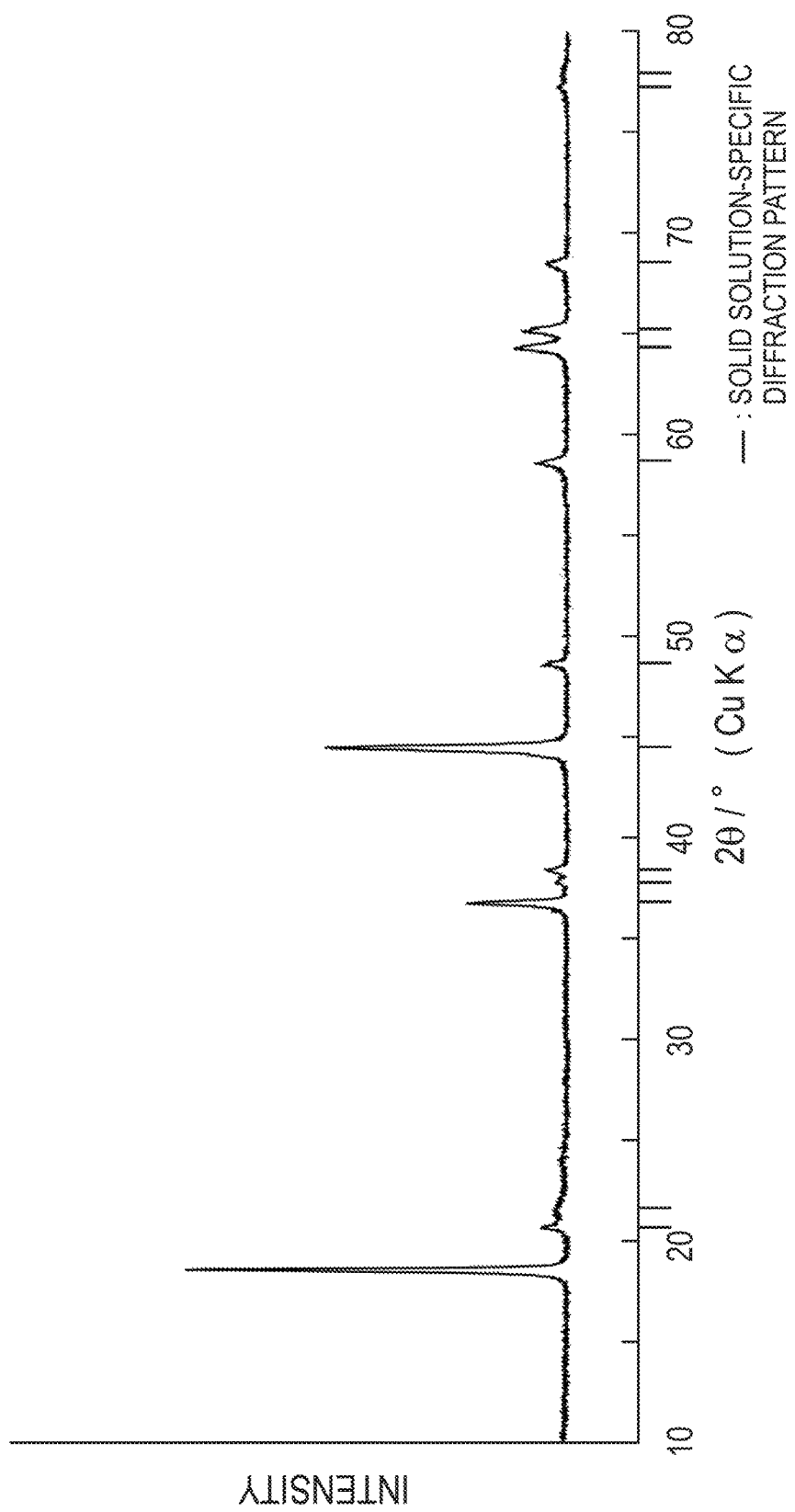
FIG. 3 is a chart illustrating an X ray diffraction pattern of solid solution positive electrode active material C0, which does not contain Ti.

The X ray diffraction pattern of the positive electrode active material C0 which does not contain Ti and has the following composition is illustrated in FIG. 3 for comparison.

Composition formula: $Li_{1.5}[Ni_{0.450}Mn_{0.850}[Li]_{0.20}Ti_{0.00}]O_z$

Figure 4:
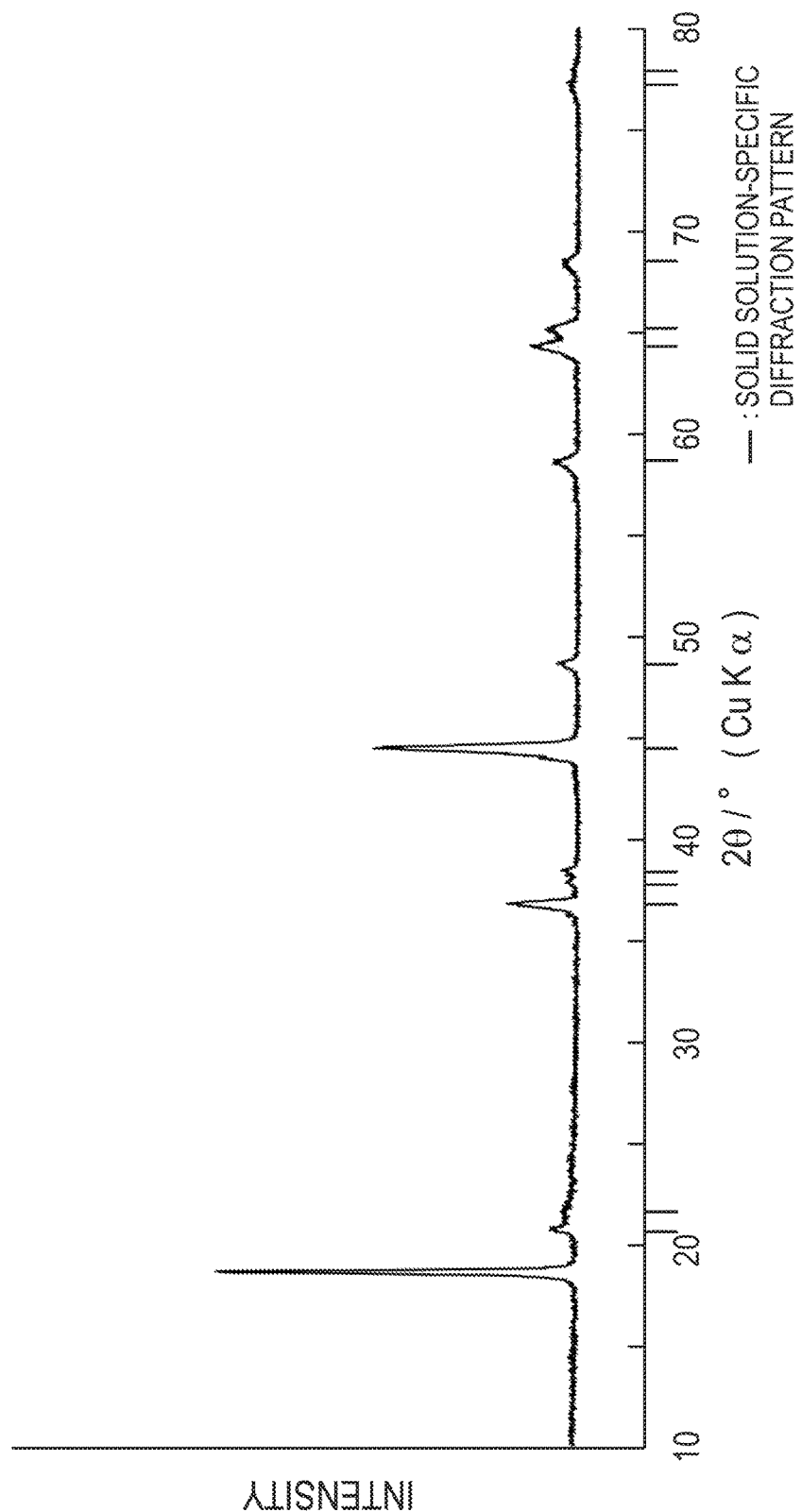
FIG. 4 is a chart illustrating an X ray diffraction pattern of solid solution positive electrode active material C1, which is obtained in Example 1.

Furthermore, the X ray diffraction pattern of the solid solution positive electrode active material C1 is illustrated in FIG. 4.

In FIGS. 3 and 4, a peak attributed to the super lattice structure that is characteristic for the solid solution system is observed at 20 to 23°. Furthermore, it was observed in FIG. 4 that the peaks at 36.5 to 37.5° (101) and 44 to 45° (104) and 64 to 65° (108)/65 to 66° (110) slightly shifted to a lower angle side. In addition, the diffraction peak attributed to the spinel phase was not observed from any samples.

(Fabrication of Positive Electrode C1 Having Positive Electrode Active Material Layer Formed on Single Surface of Current Collector)

(Composition of Slurry for Positive Electrode)

The slurry for positive electrode had the following composition. Positive electrode active material: Ti substituted solid solution positive electrode active material C1 obtained from above 9.4 parts by weight Conductive Aid:
 Flaky graphite 0.15 part by weight
 Acetylene black 0.15 part by weight
Binder: Polyvinylidene fluoride (PVDF) 0.3 part by weight
Solvent: N-methyl-2-pyrrolidone (NMP) 8.2 parts by weight.

When the above composition is applied to the formula (2), e=94 is obtained, and thus the requirement of the formula (2) is satisfied.

(Preparation of Slurry for Positive Electrode)

The slurry for a positive electrode having the above-described composition was prepared as follows. First, 2.0 parts by weight of a 20% binder solution in which a binder is dissolved in a solvent (NMP) and 4.0 parts by weight of the solvent (NMP) were added to a 50 ml disposable cup. The resulting mixture was stirred with a stirring deaerator (rotating and revolving mixer: Awatori Rentaro AR-100) for one minute to prepare a binder diluted solution. Subsequently, 0.4 part by weight of a conductive aid, 9.2 parts by weight of solid solution positive electrode active material C1, and 2.6 parts by weight of the solvent (NMP) were added to this binder diluted solution. The resulting mixture was stirred for 3 minutes using the stirring deaerator to obtain a slurry for a positive electrode (solid concentration: 55% by weight).

(Coating • Drying of Slurry for Positive Electrode)

One surface of aluminum current collector having a thickness of 20 μm was coated with the slurry for a positive electrode using an automatic coating device (doctor blade: PI-1210 automatic coating apparatus manufactured by Tester Sangyo Co., Ltd.). Subsequently, this current collector coated with the slurry for a positive electrode was dried using a hot plate (100° C. to 110° C., drying time: 30 minutes) to form a sheet-like positive electrode having a remaining NMP amount of 0.02% by weight or less in the positive electrode active material layer.

(Press of Positive Electrode)

The above sheet-like positive electrode was subjected to compression molding by applying a roller press, and cut to manufacture positive electrode having a weight of one surface of the positive electrode active material layer of about 17.0 mg/cm$^2$ and a density of 2.65 g/cm$^3$.

(Drying of Positive Electrode)

Subsequently, the positive electrode which was prepared according to the above procedures was dried in a vacuum drying furnace. The positive electrode was disposed in the drying furnace, and then the pressure was reduced (100 mmHg (1.33×10$^4$ Pa)) at room temperature (25° C.) to remove the air in the drying furnace. Subsequently, the temperature was raised to 120° C. at 10° C./min while nitrogen gas was circulated (100 cm$^3$/min), and the pressure was reduced again at 120° C. The positive electrode was allowed to stand for 12 hours while nitrogen in the furnace was discharged, and then the temperature was lowered to room temperature. Positive electrode C1 from the surface of which water had been removed was obtained in this way.

(Preparation of Negative Electrode A1 in which Active Material Layer is Formed on Single Surface of Current Collecting Foil)

As a Si-containing alloy which is a negative electrode active material, $Si_{29}Ti_{62}Ge_9$ was used. Meanwhile, the Si-containing alloy was prepared by a mechanical alloying method. Specifically, it was obtained in a manner such that a planetary ball mill P-6 (manufactured by Fritsch, Germany) was used, and zirconia pulverization balls and each raw material powder of the alloy was put into a zirconia pulverizing pot so as to subject the mixture to alloying processing at 600 rpm and for 48 hours.

Furthermore, because the Si-containing alloy ($Si_{29}Ti_{62}Ge_9$) prepared above and other alloys which may be used in the present invention (those of $Si_xTi_yGe_zA_a$, $Si_xTi_yZn_zA_a$, and $Si_xTi_ySn_zA$, except $Si_{29}Ti_{62}Ge_9$) have the same characteristics as $Si_{29}Ti_{62}Ge_9$, the same or similar results are obtained as the present example in which $Si_{29}Ti_{62}Ge_9$ is used.

(Composition of Slurry for Negative Electrode)

The slurry for a negative electrode had the following composition.

Negative Electrode Active Material:
 Si-containing alloy ($Si_{29}Ti_{62}Ge_9$) 1.38 parts by weight
 Carbon material (manufactured by Hitachi Chemical Company, Ltd., graphite) 7.82 parts by weight
Conductive aid: SuperP 0.40 part by weight
Binder: Polyvinylidene fluoride (PVDF) 0.40 part by weight
Solvent: N-methyl-2-pyrrolidone (NMP) 10.0 parts by weight.

When the above composition is applied to the formula (1), $\alpha+\beta=92.0$, $\alpha=2.8$, and $\beta=78.2$ are obtained, and thus the requirement of the formula (1) is satisfied. Incidentally, the average particle diameter of the carbon material was 24 μm and the average particle diameter of the Si-containing alloy was 0.5 μm.

(Production of Slurry for Negative Electrode)

The slurry for a negative electrode having the above-described composition was prepared as follows. First, 5.0 parts by weight of (NMP) was added to 2.0 parts by weight of a 20% binder solution in which a binder is dissolved in the solvent (NMP). The resulting mixture was stirred with a stirring deaerator for one minute to prepare a binder diluted solution. To this diluted binder solution, 0.4 part by weight of a conductive aid, 9.2 parts by weight of negative electrode active material powder, and 5.0 parts by weight of the solvent (NMP) were added. The resulting mixture was stirred for 3 minutes using the stirring deaerator to obtain a slurry for a negative electrode (solid concentration: 50% by weight).

(Coating•Drying of Slurry for Negative Electrode)

One surface of electrolytic copper current collector having a thickness of 10 μm was coated with the slurry for a negative electrode using an automatic coating device. Subsequently, this current collector coated with the slurry for a negative electrode was dried using a hot plate (100° C. to 110° C., drying time: 30 minutes) to form a sheet-like negative electrode having a remaining NMP amount of 0.02% by weight or less in the negative electrode active material layer.

(Press of Negative Electrode)

The obtained sheet-like negative electrode was subjected to compression molding by applying a roller press, and cut to manufacture negative electrode having a weight of one surface of the negative electrode active material layer of about 8.54 mg/cm$^2$ and a density of 1.45 g/cm$^3$. When the surface of negative electrode was observed, an occurrence of crack was not observed.

(Drying of Electrode)

Subsequently, the negative electrode which was prepared according to the above procedure was dried in a vacuum drying furnace. The negative electrode was disposed in the drying furnace, and then the pressure was reduced (100 mmHg (1.33×10$^4$ Pa)) at room temperature (25° C.) to remove the air in the drying furnace. Subsequently, the temperature was raised to 135° C. at 10° C./min while nitrogen gas was circulated (100 cm$^3$/min), and the pressure was reduced again at 135° C. The negative electrode was allowed to stand for 12 hours while nitrogen in the furnace was discharged, and then the temperature was lowered to room temperature. Negative electrode A1 from the surface of which water had been removed was obtained in this way.

[Determination of Capacity of Positive Electrode C1]
[Fabrication of Coin Cell]

The positive electrode C1 obtained as described above (punched to have diameter of 15 mm) was placed to face the counter electrode made of a lithium foil (manufactured by Honjo Metal Co., Ltd. diameter: 16 mm; thickness: 200 μm) via a separator (diameter: 17 mm, Celgard 2400 manufactured by Celgard, LLC.), and an electrolyte solution was injected therein so as to prepare a CR2032 type coin cell.

Incidentally, the electrolyte solution used was prepared in a manner such that LiPF$_6$ (lithium hexafluorophosphate) was dissolved, at a concentration of 1 M, into a mixed non-aqueous solvent in which ethylene carbonate (EC) and diethyl carbonate (DEC) are mixed in a volume ratio of 1:1.

The activation treatment and performance evaluation were performed by use of a charging and discharging tester (HJ0501SM8A manufactured by Hokuto Denko Corporation) in a thermostat bath (PFU-3K manufactured by ESPEC Corp.) set at the temperature of 298 K (25° C.).

[Activation Treatment]

First, two cycles of charging at 0.1 C at 25° C. until the voltage becomes 4.45 V by a constant current charging method and thereafter, discharging at 0.1 C to 2.0 V, were performed. Similarly, one cycle of charging at 0.1 C at 25° C. until the voltage becomes 4.55 V by a constant current charging method, and then discharging at 0.1 C to 2.0 V, and one cycle of charging at 0.1 C until the voltage becomes 4.65 V and thereafter, discharging at 0.1 C to 2.0 V, were performed. Furthermore, one cycle of charging at 0.1 C at 25° C. until the voltage becomes 4.75 V by a constant current charging method and then discharging at 0.1 C to 2.0 V, was performed.

[Performance Evaluation]

With regard to the evaluation of battery, the charging was performed by a constant current and constant voltage charging method to charge the battery at rate of 0.1 C until the maximum voltage reached 4.5 V and then to retain for about 1 to 1.5 hours, and the discharging was performed by a constant current discharging method to discharge the battery at rate of 0.1 C until the minimum voltage of the battery reached 2.0 V. The discharge capacity at rate of 0.1 C was used as "0.1 C discharge capacity (mAh/g)"

As a result, it was found that the positive electrode C1 had discharge capacity per active material of 221 mAh/g and discharge capacity per unit electrode area of 3.61 mAh/cm$^2$.

[Determination of Capacity of Negative Electrode A1]
[Fabrication of Coin Cell]

The negative electrode A1 obtained as described above (punched to have diameter of 15 mm) was placed to face the counter electrode made of a lithium foil (manufactured by Honjo Metal Co., Ltd.; diameter: 16 mm; thickness: 200 μm) via a separator (diameter: 17 mm, Celgard 2400 manufactured by Celgard, LLC.), and an electrolyte solution was injected therein so as to prepare a CR2032 type coin cell.

Incidentally, the electrolyte solution used was prepared in a manner such that LiPF$_6$ (lithium hexafluorophosphate) was dissolved, at a concentration of 1 M, into a mixed non-aqueous solvent in which ethylene carbonate (EC) and diethyl carbonate (DEC) were mixed in a volume ratio of 1:1.

The performance evaluation were performed by use of a charging and discharging tester (HJ0501SM8A manufactured by Hokuto Denko Corporation) in a thermostat bath (PFU-3K manufactured by ESPEC Corp.) set at the temperature of 298 K (25° C.).

[Performance Evaluation]

With regard to the evaluation of battery, a constant current and constant voltage charging method in which the battery is charged at rate of 0.1 C from 2 V to 10 mV (the process of Li intercalation to the negative electrode as an evaluation subject) followed by maintaining for approximately 1 to 1.5 hours was performed. For the discharging process (the process of Li desorption from the negative electrode), a constant current mode was employed and a constant current discharging method in which the battery is charged at rate of 0.1 C from 10 mV to 2 V was performed. The discharge capacity at rate of 0.1 C was used as "0.1 C discharge capacity (mAh/g)"

As a result, it was found that the negative electrode A1 had discharge capacity per active material of 570 mAh/g and discharge capacity per unit electrode area of 4.08 mAh/cm$^2$.

[Fabrication of Laminate Cell]

Positive electrode C1 obtained above was cut so as to have an active material layer area with length 2.5 cm×width 2.0 cm. Uncoated surfaces (surfaces of aluminum current collecting foil, not coated with slurry) of these two pieces were stuck to each other such that the current collectors thereof face each other, and the current collector part was subjected to spot welding. A positive electrode having positive electrode active material layers, which are formed on both surfaces of the two-layered current collecting foil integrated by spot welding in the outer periphery thereof, was thereby formed. Thereafter, a positive electrode tab (positive electrode current collecting plate) of aluminum was welded to the current collector part to form positive electrode C11. That is, positive electrode C11 has the active material layers formed on both surfaces of the current collecting foil.

Meanwhile, the negative electrode A1 obtained above was cut so as to have an active material layer area with length 2.7 cm×width 2.2 cm. Thereafter, a negative electrode tab of electrolytic copper was welded to the current collector part to form negative electrode A11. That is, the negative electrode A11 has the active material layer formed on one surface of the current collector.

A five-layered laminate type power generating element was manufactured by sandwiching a separator (S) made of porous polypropylene (length 3.0 cm×width 2.5 cm, thickness 25 μm, porosity 55%) between these negative electrode A11 and positive electrode C11 to which tabs had been welded. The laminate type power generating element had a structure of negative electrode (one surface)/separator/positive electrode (both surfaces)/separator/negative electrode (one surface), that is, a structure in which A11-(S)—C11-(S)-A11 were laminated in this order. Subsequently, both sides thereof were sandwiched by a laminate film outer casing made of aluminum (length 3.5 cm×width 3.5 cm). Three sides thereof were sealed by thermocompression bonding to house the power generating element. Into this power generating element, 0.8 cm$^3$ (the above five-layered structure has a two-cell structure and an injection amount per cell was 0.4 cm$^3$) of an electrolyte solution was injected. Thereafter, the remaining one side was temporarily sealed by thermocompression bonding to manufacture a laminate type battery. In order to make the electrolyte solution go inside electrode pores sufficiently, the laminate type battery was allowed to stand at 25° C. for 24 hours while a contact pressure of 0.5 MPa was applied thereto.

Incidentally, the following material was used for preparing the electrolyte solution. First, 1.0 M of $LiPF_6$ (electrolyte) was dissolved in a mixed solvent of 30% by volume of ethylene carbonate (EC) and 70% by volume of diethyl carbonate (DEC). Thereafter, 1.8% by weight of lithium difluorophosphate ($LiPO_2F_2$) as lithium fluorophosphate acting as an additive and 1.5% by weight of methylene methane disulfonic acid (MMDS) were dissolved therein to be used as an electrolyte solution.

In the following Examples, a positive electrode and a negative electrode were produced in view of Example 1. Namely, a positive electrode and a negative electrode were produced in the same manner as Example 1 given above except for those described specifically hereinbelow.

First, with regard to a positive electrode, positive electrodes C2 to C13 were produced in the same manner as the positive electrode C1 except that the composition of the solid solution positive electrode active material was modified to those described in Table 1 below. Meanwhile, in the Table 1, charge and discharge capacity (mAh/g) per weight of an active material in the solid solution positive electrode active material to be used, coating amount (mg/cm$^2$) of the positive electrode, and charge and discharge capacity (mAh/cm$^2$) per area of the positive electrode active material layer were also given. Meanwhile, all positive electrodes were adjusted such that e=92.0 when the composition is applied to the formula (2) and the discharge capacity per area of the positive electrode active material layer was 3.61 mAh/cm$^2$.

manner as negative electrode A1 except that the composition of the negative electrode active material consisting of a Si-containing alloy and the composition of negative electrode active material layer were modified to those described in Table 2 below (for negative electrode A13, a Si-containing alloy was not used). Meanwhile, in the Table 2, charge and discharge capacity (mAh/g) per weight of the active material in the Si-containing alloy to be used, weight ratio (% by weight) of the Si-containing alloy in the negative electrode active material, charge and discharge capacity (mAh/g) per weight of the active material in the negative electrode active material, coating amount (mg/cm$^2$) of the negative electrode, and charge and discharge capacity (mAh/cm$^2$) per area of the negative electrode active material layer were also given. Meanwhile, "γ" and "η" in the Table 2 indicates % by weight of a binder and a conductive aid, respectively, in the negative electrode active material layer, and for any negative electrode, α+β=92.0 when the composition is applied to the formula (1). Furthermore, for A1 to A12, an adjustment was made such that the discharge capacity per area of the negative electrode active material layer was 4.08 mAh/cm$^2$.

TABLE 1

| Positive electrode | Composition Li | a | b | c | d | | e | Charge capacity mAh/g | Discharge capacity mAh/g | Coating amount mg/cm$^2$ | Charge capacity mAh/cm$^2$ | Discharge capacity mAh/cm$^2$ |
|---|---|---|---|---|---|---|---|---|---|---|---|---|
| C1  | 1.500 | 0.450 | 0.750 | — | 0.200 | Ti | 0.100 | 271 | 221 | 17.4 | 4.43 | 3.61 |
| C2  | 1.500 | 0.525 | 0.725 | — | 0.150 | Ti | 0.100 | 270 | 220 | 17.5 | 4.43 | 3.61 |
| C3  | 1.500 | 0.375 | 0.775 | — | 0.250 | Ti | 0.100 | 282 | 230 | 16.7 | 4.43 | 3.61 |
| C4  | 1.500 | 0.600 | 0.700 | — | 0.100 | Ti | 0.100 | 269 | 219 | 17.5 | 4.43 | 3.61 |
| C5  | 1.500 | 0.300 | 0.800 | — | 0.300 | Ti | 0.100 | 291 | 237 | 16.2 | 4.43 | 3.61 |
| C6  | 1.500 | 0.225 | 0.825 | — | 0.350 | Ti | 0.100 | 302 | 246 | 15.6 | 4.43 | 3.61 |
| C7  | 1.500 | 0.450 | 0.800 | — | 0.200 | Ti | 0.050 | 290 | 237 | 16.2 | 4.41 | 3.61 |
| C8  | 1.500 | 0.450 | 0.650 | — | 0.200 | Ti | 0.200 | 265 | 218 | 17.6 | 4.39 | 3.61 |
| C9  | 1.500 | 0.450 | 0.800 | — | 0.200 | Zr | 0.050 | 272 | 222 | 17.3 | 4.43 | 3.61 |
| C10 | 1.500 | 0.450 | 0.750 | — | 0.200 | Zr | 0.100 | 271 | 221 | 17.4 | 4.43 | 3.61 |
| C11 | 1.500 | 0.450 | 0.825 | — | 0.200 | Nb | 0.025 | 274 | 223 | 17.2 | 4.43 | 3.61 |
| C12 | 1.500 | 0.450 | 0.800 | — | 0.200 | Nb | 0.050 | 271 | 221 | 17.4 | 4.43 | 3.61 |

| Positive electrode | Composition Li | a | b | c | d | e | Charge capacity mAh/g | Discharge capacity mAh/g | Coating amount mg/cm2 | Charge capacity mAh/cm2 | Discharge capacity mAh/cm2 |
|---|---|---|---|---|---|---|---|---|---|---|---|
| C13 | 1.500 | 0.450 | 0.850 | — | 0.200 | — — | 280 | 226 | 17.0 | 4.47 | 3.61 |

On the other hand, with regard to the negative electrode, negative electrodes A2 to A14 were produced in the same

TABLE 2

| Negative electrode | Alloy composition wt % | | | Alloy discharge capacity | Electrode composition wt % | | | | [α]/[α + β] wt % | Charge capacity mAh/g | Discharge capacity mAh/g | Coating amount mg/cm$^2$ | Charge capacity mAh/cm$^2$ | Discharge capacity mAh/cm$^2$ |
|---|---|---|---|---|---|---|---|---|---|---|---|---|---|---|
| | | | | | α | β | γ | η | | | | | | |
| A1 | Si 29 | Ti 62 | Ge 9 | mAh/g 1149 | 13.8 | 78.2 | 4.0 | 4.0 | 15 | 570 | 481 | 8.48 | 4,84 | 4.08 |
| A2 | Si 49 | Ti 32 | Sn 19 | mAh/g 1538 | 13.8 | 78.2 | 4.0 | 4.0 | 15 | 639 | 539 | 7.57 | 4.83 | 4.08 |
| A3 | Si 53 | Ti 21 | Zn 26 | mAh/g 1216 | 13.8 | 78.2 | 4.0 | 4.0 | 15 | 582 | 491 | 8.31 | 4.84 | 4.08 |

TABLE 2-continued

| | | | | | | | | | | | | |
|---|---|---|---|---|---|---|---|---|---|---|---|---|
| A4 | Si 41 | Sn 15 | Al 43 | mAh/g 1707 | 13.8 | 78.2 | 4.0 | 4.0 | 15 | 669 | 565 | 7.23 | 4.83 | 4.08 |
| A5 | Si 34 | Sn 13 | V 53 | mAh/g 931 | 13.6 | 78.2 | 4.0 | 4.0 | 15 | 532 | 448 | 9.10 | 4.84 | 4.08 |
| A6 | Si 34 | Sn 41 | C 25 | mAh/g 1466 | 13.8 | 78.2 | 4.0 | 4.0 | 15 | 626 | 528 | 7.72 | 4.83 | 4.08 |
| A7 | Si 34 | Zn 23 | V 43 | mAh/g 912 | 13.8 | 78.2 | 4.0 | 4.0 | 15 | 528 | 445 | 9.16 | 4.84 | 4.08 |
| A8 | Si 42 | Zn 53 | Sn 5 | mAh/g 2121 | 13.8 | 78.2 | 4.0 | 4.0 | 15 | 742 | 627 | 6.51 | 4.83 | 4.08 |
| A9 | Si 31 | Zn 40 | Al 29 | mAh/g 1268 | 13.8 | 78.2 | 4.0 | 4.0 | 15 | 591 | 499 | 8.18 | 4.84 | 4.08 |
| A10 | Si 53 | Zn 44 | C 3 | mAh/g 1819 | 13.8 | 78,2 | 4.0 | 4.0 | 15 | 688 | 581 | 7.02 | 4.83 | 4.08 |
| A11 | Si 50 | Al 47 | C 3 | mAh/g 1484 | 13.8 | 78.2 | 4.0 | 4.0 | 15 | 629 | 531 | 7.68 | 4.83 | 4.08 |
| A12 | Si 67 | Al 22 | Nb 11 | mAh/g 1408 | 13.8 | 78.2 | 4.0 | 4.0 | 15 | 616 | 520 | 7.85 | 4.83 | 4.08 |

| | Composition | | | | [α]/[α + β] | Charge capacity | Discharge capacity | Coating amount | Charge capacity | Discharge capacity |
|---|---|---|---|---|---|---|---|---|---|---|
| | α | β | Υ | η | wt % | mAh/g | mAh/g | mg/cm2 | mAh/cm2 | mAh/cm2 |
| A13 | 0 | 94.5 | 3.5 | 2.0 | 0 | 390 | 363 | 12.75 | 4.70 | 4.37 |

| | Alloy composition | | | Alloy discharge capacity | Electrode composition | | | | [α]/[α + β] | Charge capacity | Discharge capacity | Coating amount | Charge capacity | Discharge capacity |
|---|---|---|---|---|---|---|---|---|---|---|---|---|---|---|
| | wt % | wt % | wt % | | α | β | Υ | η | wt % | mAh/g | mAh/g | mg/cm2 | mAh/cm2 | mAh/cm2 |
| A14 | Si 41 | Sn 15 | Al 43 | mAh/g 1707 | 92.0 | 0.0 | 4.0 | 4.0 | 100 | 2008 | 1707 | 2.39 | 4.80 | 4.08 |

Subsequently, by combining the positive electrodes C1 to C13 that were obtained from above with the negative electrodes A1 to A14 that were obtained from above according to the description shown in Table 3 below, batteries were fabricated in view of the Example 1

Examples 1 to 27 and Comparative Examples 1 to 5

Thereafter, the power generating element of each battery obtained from the above was set at a jig provided with an evaluation cell, and a positive electrode lead and a negative electrode lead were attached to each tab end of the power generating element. A test was then performed.

[Evaluation of Battery Property]

The laminate type battery manufactured in the above was subjected to an initial charge treatment and an activation treatment under the following conditions to evaluate performance thereof.

[Initial Charge Treatment]

An aging treatment of the battery was performed as follows. Charging was performed at 25° C. at 0.05 C for 4 hours (SOC: about 20%) by a constant current charging method. Subsequently, the battery was charged at 25° C. with rate of 0.1 C to 4.45 V. Thereafter, charging was stopped, and the battery was allowed to stand in that state (SOC: about 70%) about for two days (48 hours).

[Gas Removing Treatment 1]

The one side temporarily sealed by thermocompression bonding was unsealed. Gas was removed at 10±3 hPa for five minutes. Thereafter, the one side was subjected to thermocompression bonding again to perform temporary sealing. In addition, pressure molding (contact pressure 0.5±0.1 MPa) was performed using a roller to make the electrode adhere to the separator sufficiently.

[Activation Treatment]

Two cycles of charging at 25° C. at 0.1 C until the voltage became 4.45 V by a constant current charging method and thereafter, discharging at 0.1 C to 2.0 V, were performed. Similarly, one cycle of charging at 25° C. at 0.1 C until the voltage became 4.55 V by a constant current charging method and then discharging at 0.1 C to 2.0 V, and one cycle of charging at 0.1 C until the voltage became 4.65 V and then discharging at 0.1 C to 2.0 V, were performed. Furthermore, one cycle of charging at 25° C. at 0.1 C until the voltage became 4.75 V by a constant current charging method and then discharging at 0.1 C to 2.0 V was performed.

[Gas Removing Treatment 2]

The one side temporarily sealed by thermocompression bonding was unsealed. Gas was removed at 10±3 hPa for five minutes. Thereafter, the one side was subjected to thermocompression bonding again to perform regular sealing. In addition, pressure molding (contact pressure: 0.5±0.1 MPa) was performed using a roller to make the electrode adhere to the separator sufficiently.

[Evaluation of Rate Property]

Evaluation of the battery rate property was performed as follows. That is, the battery was charged by a constant current constant voltage charging method in which the battery was charged at rate of 0.1 C until the maximum voltage became 4.5 V, and then the battery was allowed to stand about for 1 hour to 1.5 hours. The battery was discharged by a constant current discharge method in which the battery was discharged at rate of 0.1 C or at rate of 2.5 C until the battery minimum voltage becomes 2.0 V. All tests were performed at room temperature. The rate properties were evaluated in terms of the ratio of the capacity at discharge at 2.5 C relative to the capacity at discharge at 0.1 C. Results are shown in the Table 3 below.

[Evaluation of Battery Lifetime]

In a life time test of the battery, 100 cycles of the above charging and discharging at rate of 1.0 C were repeated at 25° C. Battery evaluation was performed as follows. That is, the battery was charged by a constant current constant voltage charging method in which the battery was charged at rate of 0.1 C until the maximum voltage became 4.5 V, and then the battery was allowed to stand about for 1 hour to 1.5 hours. The battery was discharged by a constant current discharge method in which the battery was discharged at rate of 0.1 C until the battery minimum voltage became 2.0 V. All tests were performed at room temperature.

The ratio of the discharge capacity at the 100th cycle with respect to the discharge capacity at the 1st cycle was referred to as "capacity retention rate (%)". Results are shown in Table 3 below.

Capacity retention rate (%)=Discharge capacity at the 100th cycle/Discharge capacity at the 1st cycle×100

TABLE 3

| Example | Positive electrode | Coating amount mg/cm² | Negative electrode | Coating amount mg/cm² | Capacity retention rate % at the 100th cycle | 2.5 C/0.1 C Capacity retention rate % |
|---|---|---|---|---|---|---|
| 1 | C1 | 17.4 | A1 | 8.48 | 92 | 87 |
| 2 | C1 | 17.4 | A2 | 7.57 | 92 | 88 |
| 3 | C1 | 17.4 | A3 | 8.31 | 92 | 86 |
| 4 | C1 | 17.4 | A4 | 7.23 | 94 | 90 |
| 5 | C1 | 17.4 | A5 | 9.10 | 89 | 84 |
| 6 | C1 | 17.4 | A6 | 7.72 | 87 | 89 |
| 7 | C1 | 17.4 | A7 | 9.16 | 90 | 88 |
| 8 | C1 | 17.4 | A8 | 6.51 | 96 | 92 |
| 9 | C1 | 17.4 | A9 | 8.18 | 97 | 87 |
| 10 | C1 | 17.4 | A10 | 7.02 | 91 | 89 |
| 11 | C1 | 17.4 | A11 | 7.68 | 87 | 88 |
| 12 | C1 | 17.4 | A12 | 7.85 | 96 | 89 |
| 17 | C2 | 16.2 | A1 | 8.48 | 97 | 89 |
| 18 | C3 | 17.6 | A1 | 8.48 | 95 | 86 |
| 19 | C4 | 17.3 | A1 | 8.48 | 91 | 90 |
| 20 | C5 | 17.4 | A1 | 8.48 | 92 | 85 |
| 21 | C6 | 17.2 | A1 | 8.48 | 91 | 83 |
| 22 | C7 | 16.2 | A1 | 8.48 | 91 | 89 |
| 23 | C8 | 17.6 | A1 | 8.48 | 93 | 85 |
| 24 | C9 | 17.3 | A1 | 8.48 | 91 | 89 |
| 25 | C10 | 17.4 | A1 | 8.48 | 93 | 86 |
| 26 | C11 | 17.2 | A1 | 8.48 | 92 | 87 |
| 27 | C12 | 17.4 | A1 | 8.48 | 93 | 86 |
| 1 | C1 | 17.4 | A13 | 13.31 | 81 | 67 |
| 2 | C1 | 17.4 | A14 | 2.39 | 65 | 80 |
| 3 | C13 | 17.0 | A1 | 8.48 | 82 | 84 |
| 4 | C13 | 17.0 | A13 | 13.31 | 73 | 67 |
| 5 | C13 | 17.0 | A14 | 2.39 | 58 | 80 |

As it is clearly shown in the results of Table 3, the lithium ion secondary battery of Examples 1 to 27, which are an electrical device according to the present invention, exhibited excellent properties both in terms of the cycle properties (capacity retention rate at the 100th cycle) and the rate properties (2.5 C/0.1 C capacity retention rate) when compared to Comparative Examples 1 to 5.

Meanwhile, according to the Comparative Example 1 and the Comparative Example 4 in which the negative electrode A13 was used, sufficient rate properties were not obtained as the coating amount in a negative electrode active material layer was excessively high. Meanwhile, according to the Comparative Example 2 and the Comparative Example 5 in which the negative electrode A14 is used, the coating amount in a negative electrode active material layer was excessively low so that an excessively high load was applied to the negative electrode active material. As a result, sufficient cycle durability was not obtained. Furthermore, according to the Comparative Example 3 in which the positive electrode C13 containing a solid solution positive electrode active material, in which Mn is not replaced with other metal, was used, it was impossible to have sufficient cycle durability even when the negative electrode A1 was used.

REFERENCE SIGNS LIST 10, 50 Lithium ion secondary battery
11 Negative electrode current collector
12 Positive electrode current collector
13 Negative electrode active material layer
15 Positive electrode active material layer
17 Separator
19 Single battery layer
21, 57 Power generating element
25 Negative electrode current collecting plate
27 Positive electrode current collecting plate
29, 52 Battery outer casing material
58 Positive electrode tab
59 Negative electrode tab

The invention claimed is:

1. An electrical device which comprises a power generating element containing
   a positive electrode in which a positive electrode active material layer containing a positive electrode active material is formed on the surface of a positive electrode current collector,
   a negative electrode in which a negative electrode active material layer containing a negative electrode active material is formed on the surface of a negative electrode current collector, and
   a separator,
   wherein the coating amount of the negative electrode active material layer is 3 to 11 mg/cm², the negative electrode active material layer contains a negative electrode active material which is represented by the following formula (1):

[Mathematical formula 1]

$$\alpha \text{ (Si-containing alloy)} + \beta \text{ (carbon material)} \quad (1)$$

in the formula, $\alpha$ and $\beta$ represent % by weight of each component in the negative electrode active material layer, and $80 \leq \alpha + \beta \leq 98$, $3 \leq \alpha \leq 40$, and $40 \leq \beta \leq 95$,
   the positive electrode active material layer contains a positive electrode active material which is represented by the following formula (2):

[Mathematical formula 2]

$$e \text{ (solid solution positive electrode active material)} \quad (2)$$

in the formula, e represents % by weight of each component in the positive electrode active material layer, and $80 \leq e \leq 98$, and
   the solid solution positive electrode active material has a composition which is represented by the following formula (3):

[Mathematical formula 3]

$$Li_{1.5}[Ni_aMn_bCo_c[Li]_d[X]_e]O_z \quad (3)$$

in the formula, X is at least one selected from a group consisting of Ti, Zr, and Nb, $0.01 \leq e \leq 0.4$, $a+b+c+d+e=1.5$, $0.1 \leq d \leq 0.4$, and $1.1 \leq [a+b+c+e] \leq 1.4$, and z represents an oxygen number for satisfying the atomic valence.

2. The electrical device according to claim 1, wherein the solid solution positive electrode active material has diffraction peaks indicating a rock salt type layered structure at 20 to 23°, 35 to 40° (101), 42 to 45° (104) and 64 to 65° (108)/65 to 66° (110) in the X ray diffraction (XRD) measurement.

3. The electrical device according to claim 1, wherein the solid solution positive electrode active material does not substantially have a peak other than the diffraction peak attributed to the rock salt type layered structure in the X ray diffraction (XRD) measurement.

4. The electrical device according to claim 1, wherein the solid solution positive electrode active material has three diffraction peaks at 35 to 40° (101) and one diffraction peak at 42 to 45° (104) in the X ray diffraction (XRD) measurement.

5. The electrical device according to claim 1, wherein the solid solution positive electrode active material has diffraction peaks at 20 to 23°, 35.5 to 36.5° (101), 43.5 to 44.5° (104) and 64 to 65° (108)/65 to 66° (110) in the X ray diffraction (XRD) measurement.

6. The electrical device according to claim 1, wherein the electrical device is a lithium ion secondary battery.

\* \* \* \* \*